US010775618B2

(12) United States Patent
Ilic et al.

(10) Patent No.: US 10,775,618 B2
(45) Date of Patent: Sep. 15, 2020

(54) FACIAL EXPRESSIONS FROM EYE-TRACKING CAMERAS

(71) Applicant: Magic Leap, Inc., Plantation, FL (US)

(72) Inventors: Alexander Ilic, Zurich (CH); Martin Georg Zahnert, Zurich (CH)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/295,575

(22) Filed: Mar. 7, 2019

(65) Prior Publication Data
US 2019/0285881 A1 Sep. 19, 2019

Related U.S. Application Data

(60) Provisional application No. 62/644,005, filed on Mar. 16, 2018.

(51) Int. Cl.
*G02B 27/00* (2006.01)
*G06T 13/40* (2011.01)
(Continued)

(52) U.S. Cl.
CPC ....... *G02B 27/0093* (2013.01); *G02B 27/017* (2013.01); *G06F 3/017* (2013.01); *G06T 13/40* (2013.01); *G06T 19/006* (2013.01); *G02B 2027/0138* (2013.01); *G02B 2027/0178* (2013.01)

(58) Field of Classification Search
CPC .. G02B 27/0093; G02B 27/01; G02B 27/017; G06F 3/017; G06F 3/005; G06F 3/012; G06F 3/013; G06F 3/014; G06K 9/36; G06K 9/78; G06K 9/80; G06T 19/006
See application file for complete search history.

(56) References Cited

U.S. PATENT DOCUMENTS 6,850,221 B1 2/2005 Tickle
7,133,048 B2 11/2006 Brand
(Continued)

FOREIGN PATENT DOCUMENTS

WO    WO 2019/177869    9/2019

OTHER PUBLICATIONS

Wikipedia: "Facial Action Coding System," https://en.wikipedia./org/wiki/Facial_Action_Coding_System, accessed Dec. 12, 2017 in 9 pages.

(Continued)

*Primary Examiner* — Alexander Eisen
*Assistant Examiner* — Cory A Almeida
(74) *Attorney, Agent, or Firm* — Knobbe, Martens, Olson & Bear, LLP

(57) ABSTRACT

Systems and methods for synthesizing an image of the face by a head-mounted display (HMD), such as an augmented reality device, are disclosed. The HMD may be able to observe only a portion of the face with an inward-facing imaging system, e.g., the periocular region. The systems and methods described herein can generate a mapping of a conformation of the portion of the face that is not imaged based at least partly on a conformation of the portion of the face that is imaged. The HMD can receive an image of a portion of the face and use the mapping to determine a conformation of the portion of the face that is not observed. The HMD can combine the observed and unobserved portions to synthesize a full face image.

11 Claims, 28 Drawing Sheets

(51) Int. Cl.
*G06F 3/01* (2006.01)
*G02B 27/01* (2006.01)
*G06T 19/00* (2011.01)

(56) References Cited

U.S. PATENT DOCUMENTS

| | | | |
|---|---|---|---|
| 7,481,531 | B2 | 1/2009 | Howell et al. |
| 9,081,426 | B2 | 7/2015 | Armstrong |
| 9,128,522 | B2 * | 9/2015 | Raffle ............... G06F 3/017 |
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,479,736 | B1 | 10/2016 | Karakotsios |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 9,910,275 | B2 * | 3/2018 | Gibbs ............... G02B 27/017 |
| 2012/0127062 | A1 | 5/2012 | Bar-Zeev et al. |
| 2013/0082922 | A1 | 4/2013 | Miller |
| 2013/0125027 | A1 | 5/2013 | Abovitz |
| 2014/0306866 | A1 | 10/2014 | Miller et al. |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0326570 | A1 | 11/2015 | Publicover et al. |
| 2015/0346490 | A1 | 12/2015 | TeKolste et al. |
| 2015/0362992 | A1 * | 12/2015 | Jacobs ............... G02B 27/01 345/8 |
| 2016/0011419 | A1 | 1/2016 | Gao |
| 2016/0026253 | A1 | 1/2016 | Bradski et al. |
| 2017/0091535 | A1 * | 3/2017 | Yu ............... G06K 9/00248 |
| 2017/0109580 | A1 * | 4/2017 | Kaehler ............ G02B 27/0093 |
| 2017/0178306 | A1 | 6/2017 | Le Clerc et al. |
| 2018/0137678 | A1 | 5/2018 | Kaehler |
| 2018/0276454 | A1 * | 9/2018 | Han ............... G06K 9/00255 |

OTHER PUBLICATIONS

Wikipedia: "Morph target animation," https://en.wikipedia.org/wiki/Morph_target_animation, accessed Feb. 9, 2017 in 2 pages.
Bassili, "Emotion Recognition: The Role of Facial Movement and the Relative Importance of Upper and Lower Areas of the Face," Journal of Personality and Social Psychology, Nov. 1979, vol. 37, No. 11, 2049-2058.
Blanz, V. et al.: "A Morphable Model for the Synthesis of 3D Faces," International Conference on Computer Graphics and Interactive Techniques, Aug. 1999, in 8 pages.
Ekman et al., "FACS—Facial Action Coding System," https://www.cs.cmu.edu/~face/facs.htm, accessed Feb. 15, 2018 in 5 pages.
Vlasic, D. et al.: "Face Transfer with Multilinear Models," Proceedings of the International Conference on Computer Graphics and Interactive Techniques, Jul. 2006, in 9 pages.
Zhang et al., "Robust and Rapid Generation of Animated Faces From Video Images: A Model-Based Modeling Approach," International Journal of Computer Vision, 58(1):93-119, Jun. 2004.
International Search Report and Written Opinion, re PCT Application No. PCT/US2019/021219, dated May 10, 2019.

* cited by examiner

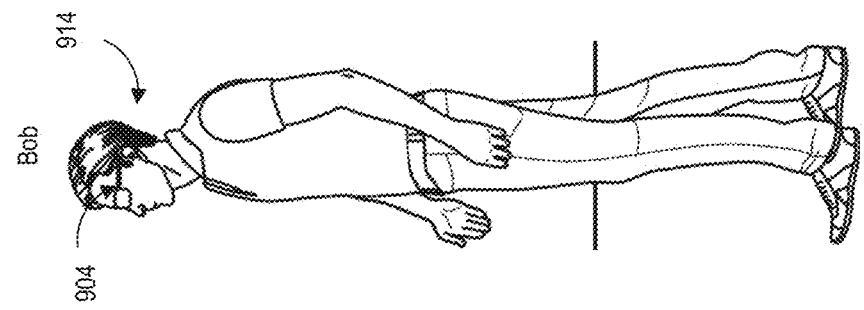
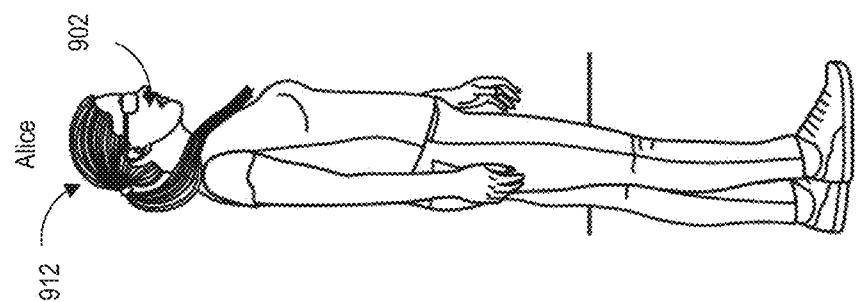
FIG. 10B

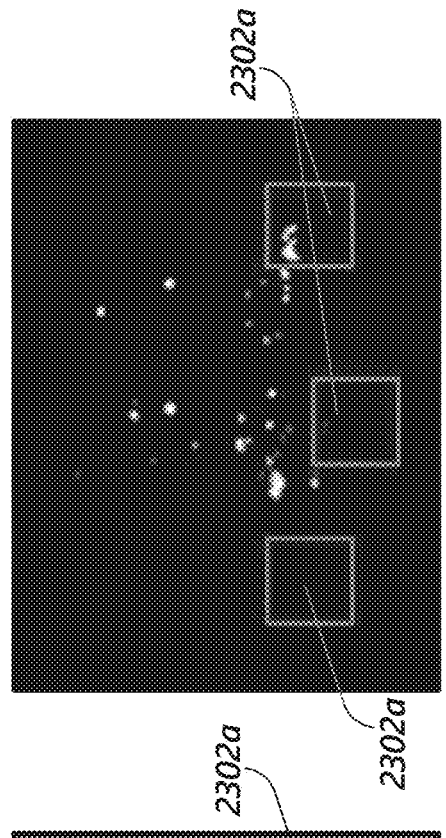
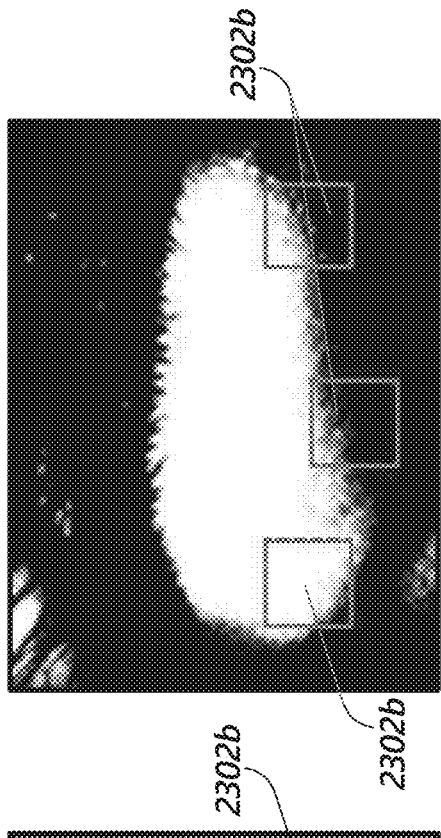
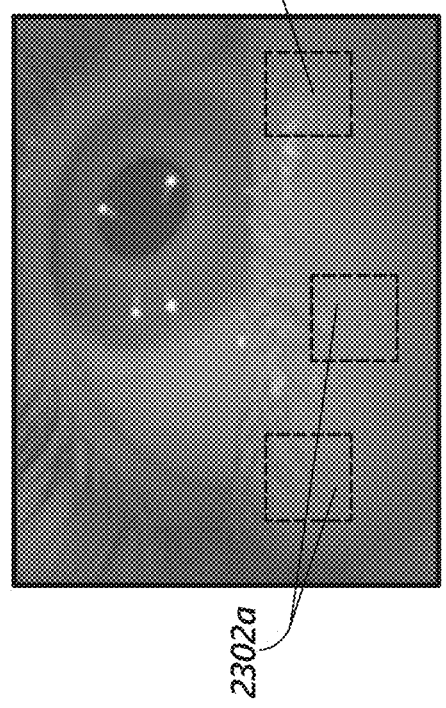
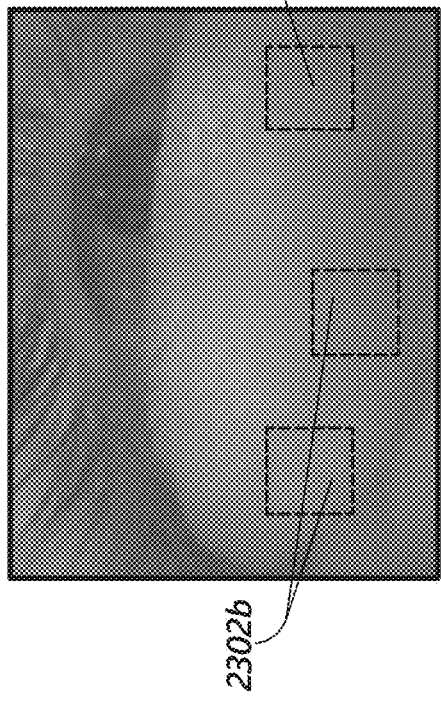
FIG. 20A
FIG. 20B
FIG. 20C
FIG. 20D

FACIAL EXPRESSIONS FROM EYE-TRACKING CAMERAS

CROSS-REFERENCE TO RELATED APPLICATIONS

This application claims the benefit of priority to U.S. Patent Application No. 62/644,005, filed Mar. 16, 2018, entitled FACIAL EXPRESSIONS FROM EYE-TRACKING CAMERAS, which is hereby incorporated by reference herein in its entirety.

FIELD

The present disclosure relates to virtual reality and augmented reality imaging and visualization systems and more particularly to determining features of a region of the face unobserved by a wearable device (e.g., mouth and eyebrows) using images of a region of the face observable by the wearable device (e.g., the periocular region imaged by an eye-tracking camera).

BACKGROUND

Modern computing and display technologies have facilitated the development of systems for so called "virtual reality" or "augmented reality" or "mixed reality" experiences, wherein digitally reproduced images or portions thereof are presented to a user in a manner wherein they seem to be, or may be perceived as, real. A virtual reality, "VR", scenario typically involves presentation of digital or virtual image information without transparency to other actual real-world visual input; an augmented reality, "AR", scenario typically involves presentation of digital or virtual image information as an augmentation to visualization of the actual world around the user. Mixed reality, "MR", is a type of AR in which physical and virtual objects may co-exist and interact in real time. Many of the challenges addressed herein are applicable to VR, AR, or MR environments and for simplicity will be described in the context of AR.

Referring to FIG. 1, an augmented reality scene 1000 is depicted wherein a user of an AR technology sees a real-world park-like setting 1100 featuring people, trees, buildings in the background, and a concrete platform 1120. In addition to these items, the user of the AR technology also perceives that she "sees" a robot statue 1110 standing upon the real-world platform 1120, and a cartoon-like avatar character 1130 flying by which seems to be a personification of a bumble bee, even though these elements do not exist in the real world. As it turns out, the human visual perception system is very complex, and producing a VR or AR technology that facilitates a comfortable, natural-feeling, rich presentation of virtual image elements amongst other virtual or real-world imagery elements is challenging. Systems and methods disclosed herein address various challenges related to VR and AR (and MR) technology.

SUMMARY

Systems and methods for synthesizing an image of the face by a head-mounted display (HMD), such as an augmented reality device, are disclosed. The HMD may be able to observe only a portion of the face with an inward-facing imaging system, e.g., the periocular region. The systems and methods described herein can generate a mapping of a conformation of the portion of the face that is not imaged based at least partly on a conformation of the portion of the face that is imaged. The HMD can receive an image of a portion of the face and use the mapping to determine a conformation of the portion of the face that is not observed. The HMD can combine the observed and unobserved portions to synthesize a full face image.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 10B illustrates an example telepresence session.

FIG. 20A-20D illustrate changes in periocular region features observed as a result of a lower face event (e.g., a smile).

Figure 1:
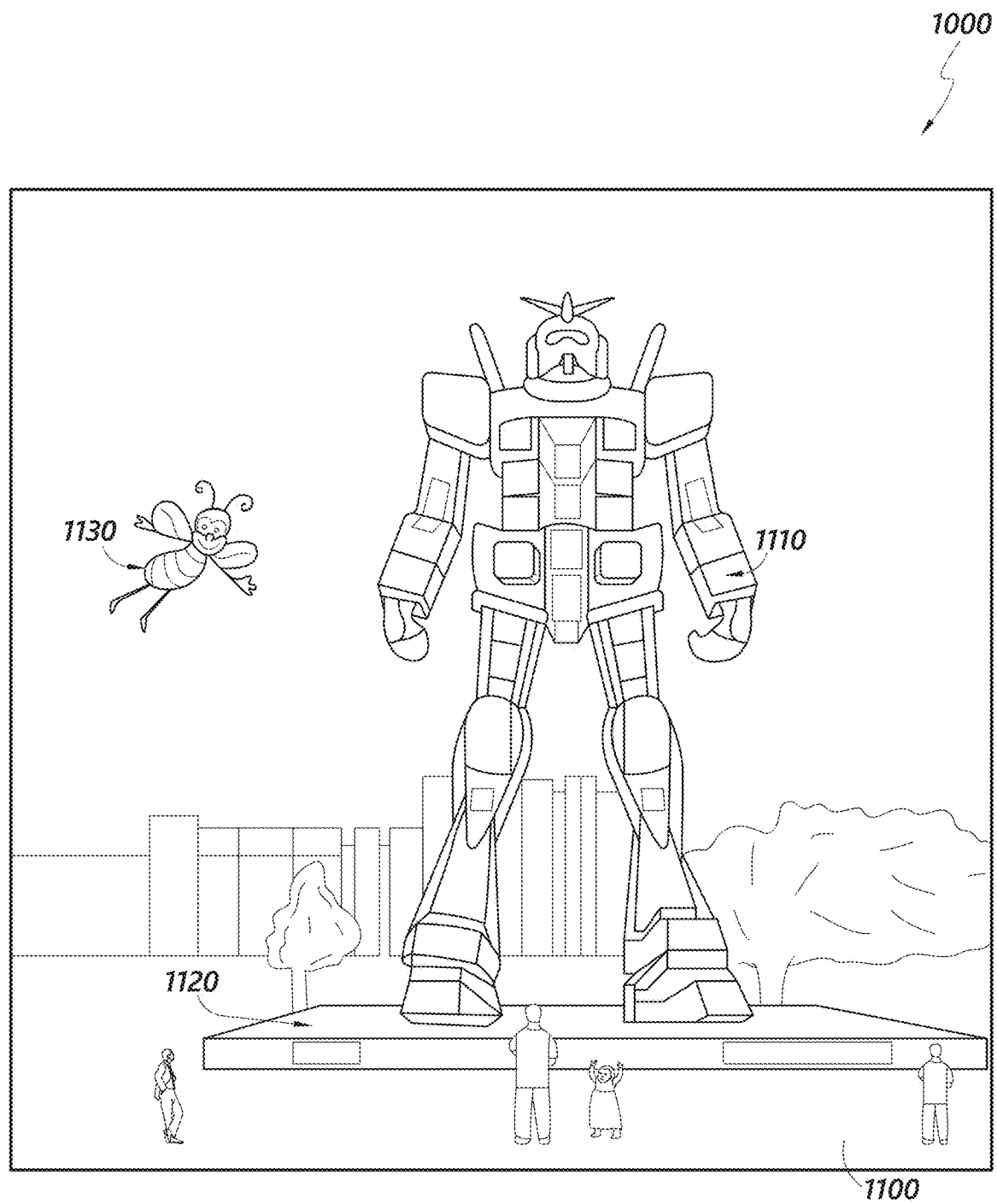
FIG. 1 depicts an illustration of an augmented reality scenario with certain virtual reality objects, and certain actual reality objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

In an augmented or a virtual reality environment, a wearable device (such as a head-mounted display) can present a virtual image in a three-dimensional (3D) space. The virtual image may include a 3D virtual avatar of a user. The 3D virtual avatar may be generated using an image of the user's face. For social VR/AR/MR applications, it can be important to accurately extract a user's facial expressions in real-time. An accurate representation of a user's facial expressions drives fidelity of presence in a telecommunication session between users (e.g., a chat session or a social presence application) by making the experience feel more interactive, vibrant, and, therefore, realistic. An inaccurate avatar facial expression representation (including lack of facial expressions) can not only fail to communicate the context or mood of the user, but also feel sterile or even creepy. Users that interact with inaccurately rendered avatars may experience a feeling of unease, which is commonly referred to as the uncanny valley, and represents a dip in human emotional response to an avatar that is almost, but not quite, human in its appearance or movements.

Therefore, a social presence application may benefit from a realistic and natural animation of the avatars of the participants. In traditional facial motion capture, typically the full face is tracked with one or more dedicated cameras. However, when a user is wearing a wearable device, a portion of the face (e.g., the periocular region surrounding the eyes) may be occluded by the wearable device. For example, if an image of the user is obtained using an external camera or an outward-facing imaging system, movements of the periocular region (e.g., eye or skin movements) may not be imaged. As another example, if the image is obtained using an inward-facing eye camera (e.g., an eye-tracking (ET) camera), the lower face region may not be imaged by the ET camera. As a result, it may be difficult to update the three-dimensional (3D) avatar of the user's face to include the user's full facial expressions (such as when the user is grinning) while the user is wearing the wearable device. While some existing technologies associate sounds (e.g., phonemes) with facial conformations (e.g., visemes) to assist avatar animation when a user is talking, such technologies are of limited use in conveying user's facial expressions and useless when the user is silent. For example, sound-based avatar generation systems cannot fully convey a user's soundless expression of surprise or smile. Accordingly, there exists a challenge on how to accurately infer key elements for social expressiveness, such as eyebrow-raises and mouth-movements, which are not directly visible to the one or more ET cameras. However, such social expressions can be beneficial to display in various human interactions in a VR/AR/MR environment.

Embodiments of the systems and methods described herein are directed to solving at least this challenge by inferring appearance of an unobservable region of the face using the images of a region of the face that can be observed by an inward-facing (e.g., ET) camera. Even though the ET cameras may not directly observe eyebrows or the lower face, the observed ET camera images may be able to identify muscle contractions or feature changes that generate movements of the eyebrows or lower face (e.g., lips or mouth or the regions of the face below the periocular regions). For example, images of a periocular region (e.g., a region surrounding the eyeball) observed by an ET camera can include some of upper periocular region (e.g., a portion of the periocular region above the pupil) which may show muscle contractions and feature changes that are related to eyebrow raises and eye shape changes. Such muscle contractions and feature changes provide potential to detect corresponding changes in facial expressions.

A lower periocular region (e.g., a portion of the periocular region below the pupil) of the observed ET images can provide potential to detect lower face conformations (e.g., shape or structure). For example, a smile may be inferred from the lifting of the lower periocular region. Accordingly, the wearable device can infer the conformation of the unobserved regions from various observed features of the periocular region. In some embodiments, the present system may generate a mapping of such feature-expression associations or inferences. The mapping may be generated using various observable feature inputs such as stretches and compressions of the skin, changes in position (e.g., movements) and shape of facial features (e.g., wrinkles, lines, blemishes, spots), optical flow of such features (e.g., their movement or trajectory over a period of time), or other observable changes of muscles, eyebrows, freckles, wrinkles, or other features extracted from images of the user's periocular region, alone or in combination. The mapping can be a part of an expression inference model. The mapping may be generic or may be personalized to the specific user. For example, an AR device may be equipped with a generic mapping representative of a large sample of users, and then the mapping can be personalized to the specific user of the AR device based on analysis of images taken of the specific user. The model may take as input observed features (e.g., raw or processed), face parameters in a face model, features extracted from the user's face, unobserved region images generated for the user's face, generic template features, etc. and generate as an output inferred images of the unobserved face or an entire face model (e.g., by combining the observed and inferred facial conformations).

The observed images may be combined with the inferred images to generate a full face image. By leveraging principles of optical flow and machine learning (e.g., artificial intelligence, neural networks, etc.), the system may accurately classify the eyebrow status and strong changes in facial features such as grinning or mouth opening in real-time. The full face image may be used to dynamically update the user's virtual avatar in an augmented, mixed, or virtual reality experience. A deformable linear model (DLM) (or other shape or texture model) for the face or a neural network can be used to determine, train, or apply the mapping. The disclosed systems and methods, unlike other approaches, also work when the user is silent.

Examples of a 3D Display

In order for a three-dimensional (3D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR and AR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Figure 2:
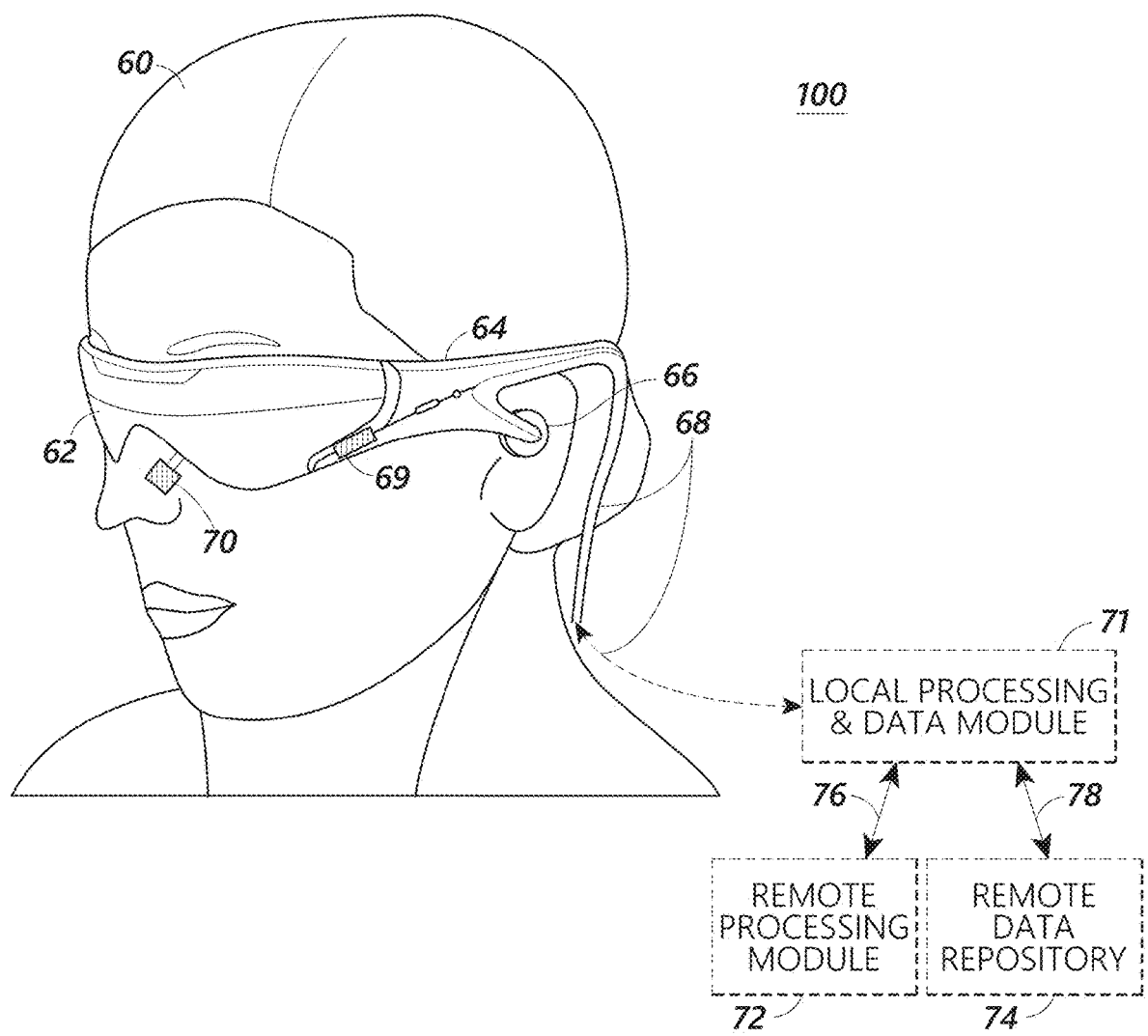
FIG. 2 schematically illustrates an example of a wearable display system.

FIG. 2 illustrates an example of wearable display system 100 (the system). The display system 100 includes a display 62, and various mechanical and electronic modules and systems to support the functioning of display 62. The display 62 may be coupled to a frame 64, which is wearable by a display system user, wearer, or viewer 60 and which is configured to position the display 62 in front of the eyes of the user 60. The display system 100 can comprise a head mounted display (HMD) that is worn on the head of the wearer. An augmented reality display (ARD) can include the wearable display system 100. In some embodiments, an audio speaker 66 is coupled to the frame 64 and positioned adjacent the ear canal of the user (in some embodiments, another speaker, not shown, is positioned adjacent the other ear canal of the user to provide for stereo/shapeable sound control). The display system 100 can include an outward-facing imaging system which observes the world in the environment around the wearer (see, e.g., the imaging system 502 shown in FIG. 4). The display system 100 can also include an inward-facing imaging system which can track the eye movements of the wearer (see, e.g., the imaging system 500 shown in FIG. 4). The inward-facing imaging system may track either one eye's movements or both eyes' movements. The display 62 can be operatively coupled 68, such as by a wired lead or wireless connectivity, to a local data processing module 71 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). In some embodiments, one or more electrooculography (EOG) sensors 70 may be coupled to the frame 64 to provide the wearable device with measurements of the corneo-retinal standing potential (which provides information on eye movements) that exists between the front and the back of the human eye. The one or more EOG sensors 70 may be placed near, on, or along the nose piece of the frame 64. In some embodiments, sensors for other types of electrophysiological measurements, such as electroretinogram or visual evoked potentials, may be provided to supplement the wearable device. In some embodiments, one or more microphones 69 may be coupled to the frame 64 and positioned near the user's mouth. The one or more microphones 69 may capture voice of the user or environmental sounds. Another microphone, not depicted in the figure, may be positioned on the other side of the depicted microphone 69 to provide for stereo/shapeable environmental sound detection. As one skilled in the art may appreciate, the input from the one or more microphones 69 may provide for audio input as well as noise cancellation.

The local processing and data module 71 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 64 or otherwise attached to the user 60), such as image capture devices (e.g., cameras), microphones 69, inertial measurement units (IMUs), accelerometers, compasses, global positioning system (GPS) units, radio devices, and/or gyroscopes; and/or b) acquired and/or processed using remote processing module 72 and/or remote data repository 74, possibly for passage to the display 62 after such processing or retrieval. The local processing and data module 71 may be operatively coupled by communication links 76 and/or 78, such as via wired or wireless communication links, to the remote processing module 72 and/or remote data repository 74 such that these remote modules are available as resources to the local processing and data module 71. In addition, remote processing module 72 and remote data repository 74 may be operatively coupled to each other.

In some embodiments, the remote processing module 72 may comprise one or more hardware processors configured to analyze and process data and/or image information. In some embodiments, the remote data repository 74 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (e.g., rotational movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 3:
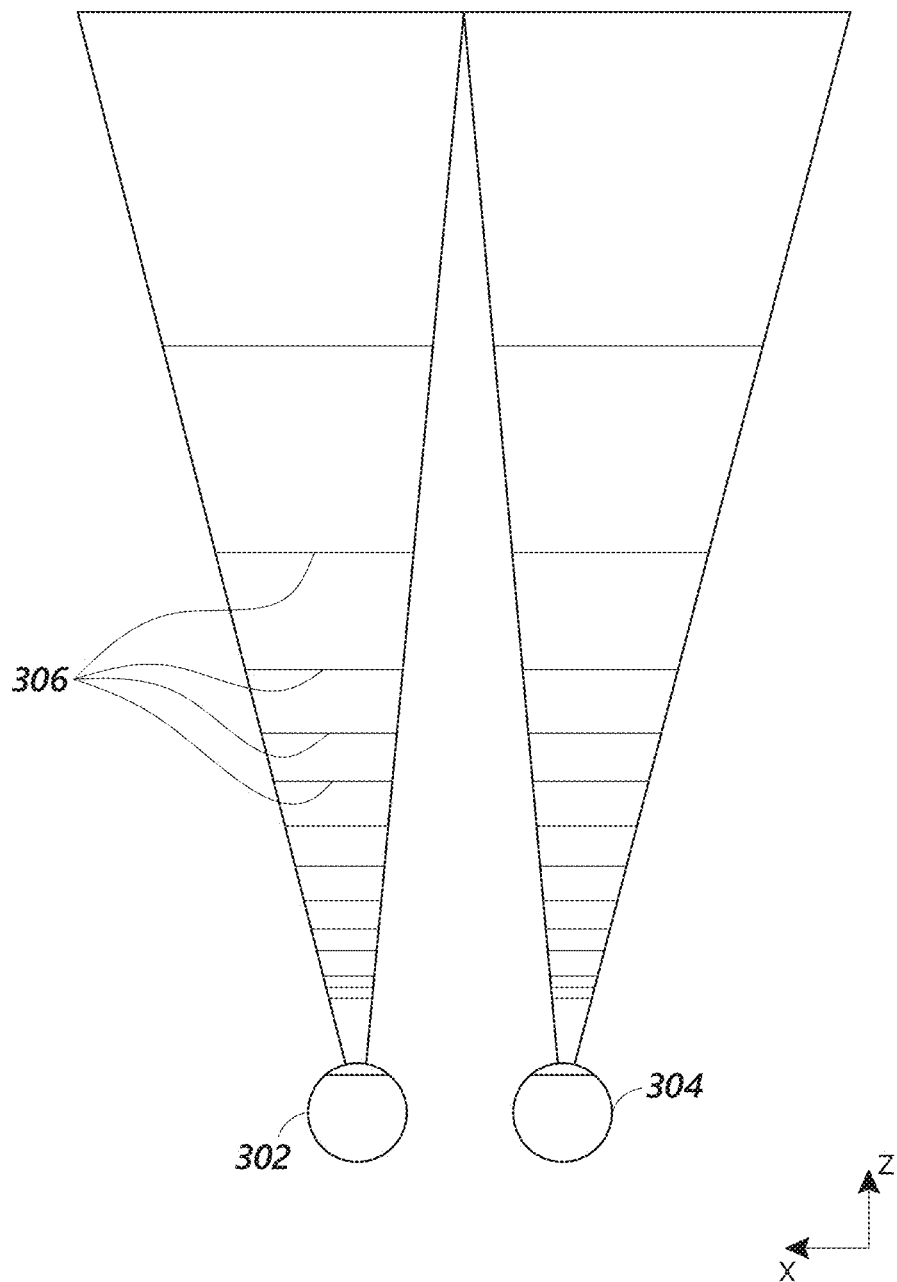
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
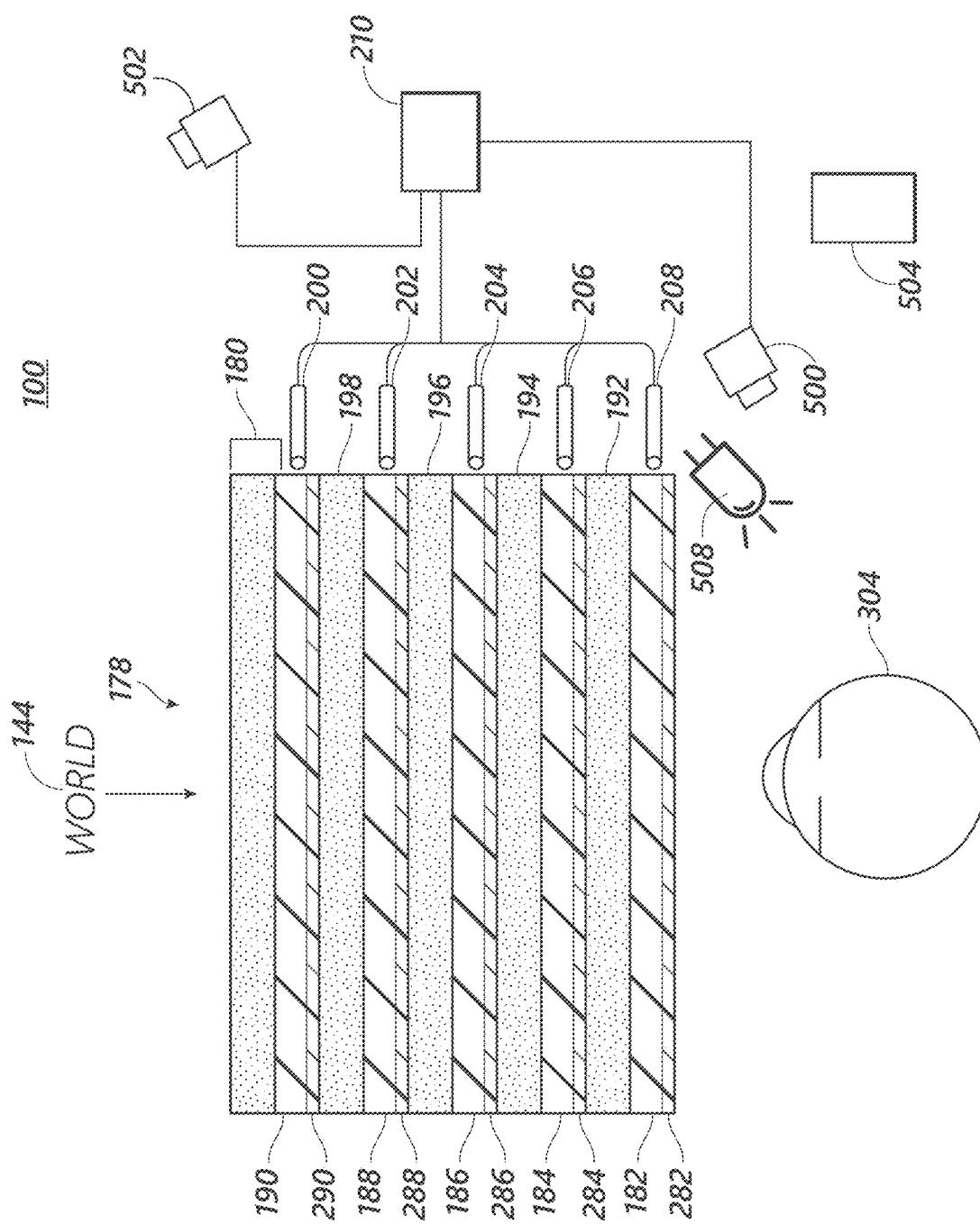
FIG. 4 schematically illustrates an example of a waveguide stack for outputting image information to a user.

FIG. 4 illustrates an example of a waveguide stack for outputting image information to a user. A display system 100 includes a stack of waveguides, or stacked waveguide assembly, 178 that may be utilized to provide three-dimensional perception to the eye/brain using a plurality of waveguides 182, 184, 186, 188, 190. In some embodiments, the display system 100 may correspond to system 100 of FIG. 2, with FIG. 4 schematically showing some parts of that system 100 in greater detail. For example, in some embodiments, the waveguide assembly 178 may be integrated into the display 62 of FIG. 2.

With continued reference to FIG. 4, the waveguide assembly 178 may also include a plurality of features 198, 196, 194, 192 between the waveguides. In some embodiments, the features 198, 196, 194, 192 may be lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may be utilized to inject image information into the waveguides 182, 184, 186, 188, 190, each of which may be configured to distribute incoming light across each respective waveguide, for output toward the eye 304. Light exits an output surface of the image injection devices 200, 202, 204, 206, 208 and is injected into a corresponding input edge of the waveguides 182, 184, 186, 188, 190. In some embodiments, a single beam of light (e.g., a collimated beam) may be injected into each waveguide to output an entire field of cloned collimated beams that are directed toward the eye 304 at particular angles (and amounts of divergence) corresponding to the depth plane associated with a particular waveguide.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208.

A controller 210 controls the operation of the stacked waveguide assembly 178 and the image injection devices 200, 202, 204, 206, 208. In some embodiments, the controller 210 includes programming (e.g., instructions in a non-transitory computer-readable medium) that regulates the timing and provision of image information to the waveguides 182, 184, 186, 188, 190. In some embodiments, the controller may be a single integral device, or a distributed system connected by wired or wireless communication channels. The controller 210 may be part of the processing modules 71 or 72 (illustrated in FIG. 2) in some embodiments.

The waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include light extracting optical elements 282, 284, 286, 288, 290 that are configured to extract light out of a waveguide by redirecting the light, propagating within each respective waveguide, out of the waveguide to output image information to the eye 304. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements 282, 284, 286, 288, 290 may, for example, be reflective and/or diffractive optical features. While illustrated disposed at the bottom major surfaces of the waveguides 182, 184, 186, 188, 190 for ease of description and drawing clarity, in some embodiments, the light extracting optical elements 282, 284, 286, 288, 290 may be disposed at the top and/or bottom major surfaces, and/or may be disposed directly in the volume of the waveguides 182, 184, 186, 188, 190. In some embodiments, the light extracting optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the light extracting optical elements 282, 284, 286, 288, 290 may be formed on a surface and/or in the interior of that piece of material.

With continued reference to FIG. 4, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 304. The collimated light may be representative of the optical infinity focal plane. The next waveguide up 184 may be configured to send out collimated light which passes through the first lens 192 (e.g., a negative lens) before it can reach the eye 304. First lens 192 may be configured to create a slight convex wavefront curvature so that the eye/brain interprets light coming from that next waveguide up 184 as coming from a first focal plane closer inward toward the eye 304 from optical infinity. Similarly, the third up waveguide 186 passes its output light through both the first lens 192 and second lens 194 before reaching the eye 304. The combined optical power of the first and second lenses 192 and 194 may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers (e.g., waveguides 188, 190) and lenses (e.g., lenses 196, 198) are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

The display system 100 can include an outward-facing imaging system 502 (e.g., a digital camera) that images a portion of the world 144. This portion of the world 144 may be referred to as the field of view (FOV) and the imaging system 502 is sometimes referred to as an FOV camera. The entire region available for viewing or imaging by a viewer may be referred to as the field of regard (FOR). In some HMD implementations, the FOR may include substantially all of the solid angle around a wearer of the HMD, because the wearer can move their head and eyes to look at objects surrounding the wearer (in front, in back, above, below, or on the sides of the wearer). Images obtained from the outward-facing imaging system 502 can be used to track gestures made by the wearer (e.g., hand or finger gestures), detect objects in the world 144 in front of the wearer, and so forth.

The display system 100 can include a user input device 504 by which the user can input commands to the controller 210 to interact with the system 100. For example, the user input device 504 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the system 100 (e.g., to provide user input to a user interface provided by the system 100). The user input device 504 may be held by the user's hand during use of the system 100. The user input device 504 can be in wired or wireless communication with the display system 100.

With continued reference to FIG. 4, the light extracting optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 198, 196, 194, 192 may not be lenses. Rather, they may simply be spacers (e.g., cladding layers and/or structures for forming air gaps).

In some embodiments, the light extracting optical elements 282, 284, 286, 288, 290 are diffractive features that form a diffraction pattern, or "diffractive optical element" (also referred to herein as a "DOE"). Preferably, the DOEs have a relatively low diffraction efficiency so that only a portion of the light of the beam is deflected away toward the eye 304 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, the display system 100 also includes an inward-facing imaging system (e.g. a digital camera) 500, which observes the movements of the wearer, such as the eye movements and the facial movements. The inward-facing imaging system 500 (e.g., a digital camera) may be used to capture images of the eye 304 to determine the size and/or orientation of the pupil of the eye 304. The inward-facing imaging system 500 can be used to obtain images for use in determining the direction the wearer 60 is looking (e.g., eye pose) or for biometric identification of the wearer (e.g., via iris identification). In some embodiments, the inward-facing imaging system 500 may be attached to the frame 64 (as illustrated in FIG. 2) and may be in electrical communication with the processing modules 71 and/or 72, which may process image information from the camera 500 to determine, e.g., the pupil diameters and/or orientations of the eyes of the user 60. In some embodiments, at least one camera 500 may be utilized for imaging each eye, to separately determine the pupil size and/or eye pose of each eye independently, thereby allowing the presentation of image information to each eye to be dynamically tailored to that eye. In some other embodiments, the pupil diameter and/or orientation of only a single eye 304 is determined (e.g., using only a camera 500 per pair of eyes) and the eye features determined for this eye are assumed to be similar for the other eye of the viewer 60. The images obtained from the inward-facing imaging system 500 may be used to obtain images for substituting the region of the wearer's face occluded by the HMD, which can be used such that a first caller can see a second caller's unoccluded face during a telepresence session. The display system 100 may also determine head pose (e.g., head position or head orientation) using sensors such as IMUs, accelerometers, gyroscopes, etc. The head's pose may be used alone or in combination with gaze direction to select and move virtual objects. In some embodiments, at least one infrared light emitting diode (IR LED) 508 may be utilized for transmitting light invisible to the unassisted human eye 304 but detectable by components of the device such as the inward-facing imaging system 500. More specifically, the IR LED 508 may be used for pupil-glint detection, eye tracking, or measurement of optical flow of facial features, which may appear more enhanced in IR light (further described in later sections).

The images obtained from the inward-facing imaging system 500 may provide the wearable display system 100 with images that comprise the periocular region (e.g., sometimes referred to herein as periocular images). The term periocular region is used in its ordinary sense, and the periocular region may include an eye and areas of the face around the eye including, e.g., an eyelid, eyelashes, an eyebrow, and skin around the eye. Examples of periocular images and periocular regions are illustrated in FIGS. 12A, 12B, 16B, 18A-18C, and 20A-20D. The periocular images may then be analyzed and extracted for facial features including stretches and compressions, changes in position (e.g., movements), shape, optical flow, or other observable changes of muscles, eyebrows, freckles, wrinkles, or other features. As discussed throughout, these facial features may provide the basis for inferring the facial expressions of the user.

Depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 210 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

Figure 5:
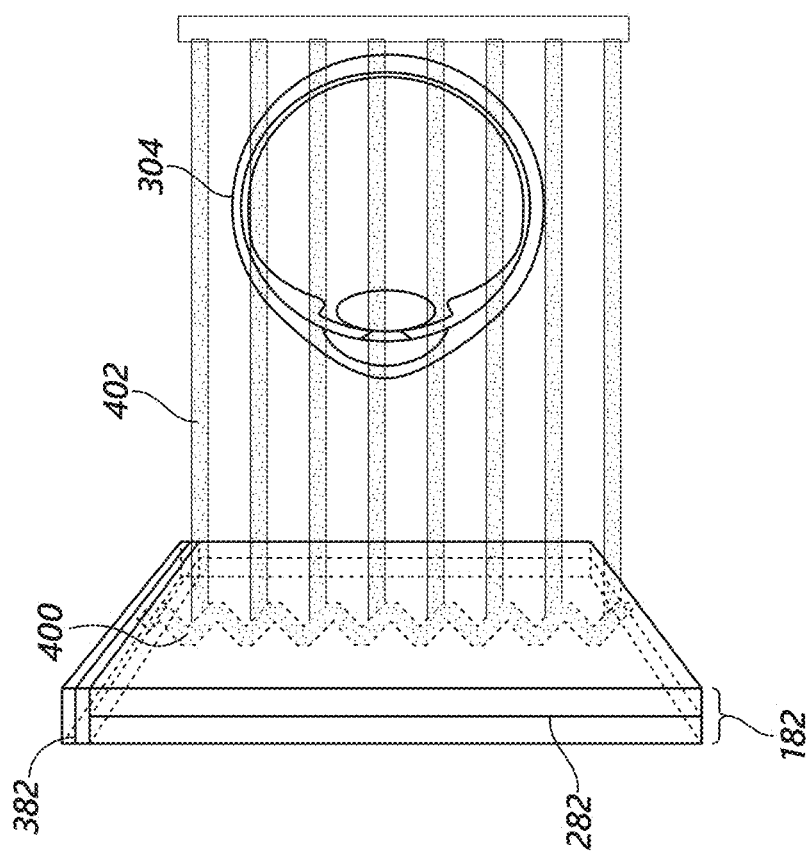
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 178 may function similarly, where the waveguide assembly 178 includes multiple waveguides. Light 400 is injected into the waveguide 182 at the input edge 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but they may also be redirected to propagate to the eye 304 at an angle (e.g., forming divergent exit beams), depending on the depth plane associated with the waveguide 182. It will be appreciated that substantially parallel exit beams may be indicative of a waveguide with light extracting optical elements that outcouple light to form images that appear to be set on a depth plane at a large distance (e.g., optical infinity) from the eye 304. Other waveguides or other sets of light extracting optical elements may output an exit beam pattern that is more divergent, which would require the eye 304 to accommodate to a closer distance to bring it into focus on the retina and would be interpreted by the brain as light from a distance closer to the eye 304 than optical infinity.

Figure 6:
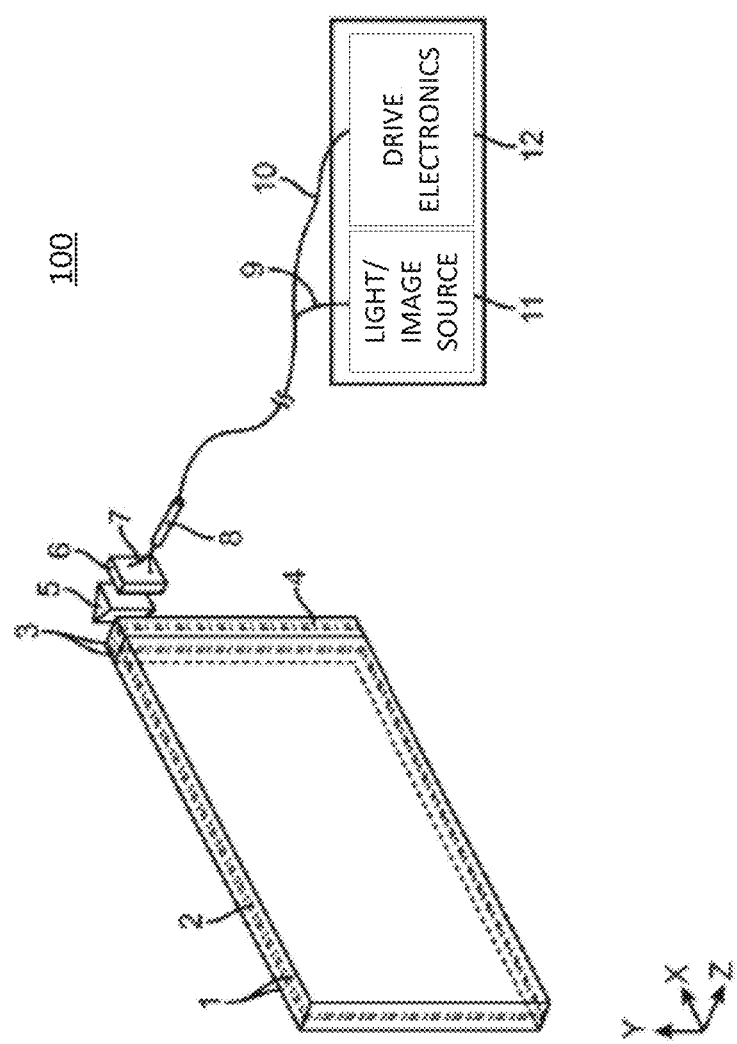
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 shows another example of the optical display system 100 including a waveguide apparatus, an optical coupler subsystem to optically couple light to or from the waveguide apparatus, and a control subsystem. The optical system 100 can be used to generate a multi-focal volumetric, image, or light field. The optical system can include one or more primary planar waveguides 1 (only one is shown in FIG. 6) and one or more DOEs 2 associated with each of at least some of the primary waveguides 1. The planar waveguides 1 can be similar to the waveguides 182, 184, 186, 188, 190 discussed with reference to FIG. 4. The optical system may employ a distribution waveguide apparatus, to relay light along a first axis (vertical or Y-axis in view of FIG. 6), and expand the light's effective exit pupil along the first axis (e.g., Y-axis). The distribution waveguide apparatus, may, for example include a distribution planar waveguide 3 and at least one DOE 4 (illustrated by double dash-dot line) associated with the distribution planar waveguide 3. The distribution planar waveguide 3 may be similar or identical in at least some respects to the primary planar waveguide 1, having a different orientation therefrom. Likewise, the at least one DOE 4 may be similar or identical in at least some respects to the DOE 2. For example, the distribution planar waveguide 3 and/or DOE 4 may be comprised of the same materials as the primary planar waveguide 1 and/or DOE 2, respectively. Embodiments of the optical display system 100 shown in FIG. 4 or 6 can be integrated into the wearable display system 100 shown in FIG. 2.

The relayed and exit-pupil expanded light is optically coupled from the distribution waveguide apparatus into the one or more primary planar waveguides 1. The primary planar waveguide 1 relays light along a second axis, preferably orthogonal to first axis, (e.g., horizontal or X-axis in view of FIG. 6). Notably, the second axis can be a non-orthogonal axis to the first axis. The primary planar waveguide 1 expands the light's effective exit pupil along that second axis (e.g., X-axis). For example, the distribution planar waveguide 3 can relay and expand light along the vertical or Y-axis, and pass that light to the primary planar waveguide 1 which relays and expands light along the horizontal or X-axis.

The optical system may include one or more sources of colored light (e.g., red (R), green (G), and blue (B) laser light or colored light from light emitting diodes (LEDs)) 11 which may be optically coupled into a proximal end of a single mode optical fiber 9. A distal end of the optical fiber 9 may be threaded or received through a hollow tube 8 of piezo-electric material. The distal end protrudes from the tube 8 as fixed-free flexible cantilever 7. The piezoelectric tube 8 can be associated with 4 quadrant electrodes (not illustrated). The electrodes may, for example, be plated on the outside, outer surface or outer periphery or diameter of the tube 8. A core electrode (not illustrated) is also located in a core, center, inner periphery or inner diameter of the tube 8.

Drive electronics 12, for example electrically coupled via wires 10, drive opposing pairs of electrodes to bend the piezoelectric tube 8 in two axes independently. The protruding distal tip of the optical fiber 7 has mechanical modes of resonance. The frequencies of resonance can depend upon a diameter, length, and material properties of the optical fiber 7. By vibrating the piezoelectric tube 8 near a first mode of mechanical resonance of the fiber cantilever 7, the fiber cantilever 7 is caused to vibrate, and can sweep through large deflections.

By stimulating resonant vibration in two axes, the tip of the fiber cantilever 7 is scanned biaxially in an area filling two dimensional (2D) scan. By modulating an intensity of light source(s) 11 in synchrony with the scan of the fiber cantilever 7, light emerging from the fiber cantilever 7 forms an image. Descriptions of such a set up are provided in U.S. Patent Publication No. 2014/0003762, which is incorporated by reference herein in its entirety.

A component 6 of an optical coupler subsystem collimates the light emerging from the scanning fiber cantilever 7. The collimated light is reflected by an optical surface 5 (e.g., a reflective surface, mirror, dichroic mirror, or prism) into the narrow distribution planar waveguide 3 which contains the at least one diffractive optical element (DOE) 4. The collimated light propagates vertically (relative to the view of FIG. 6) along the distribution planar waveguide 3 by total internal reflection, and in doing so repeatedly intersects with the DOE 4. The DOE 4 preferably has a low diffraction efficiency. This causes a fraction (e.g., 10%) of the light to be diffracted toward an edge of the larger primary planar waveguide 1 at each point of intersection with the DOE 4, and a fraction of the light to continue on its original trajectory down the length of the distribution planar waveguide 3 via TIR.

At each point of intersection with the DOE 4, additional light is diffracted toward the entrance of the primary waveguide 1. By dividing the incoming light into multiple out-coupled sets, the exit pupil of the light is expanded vertically by the DOE 4 in the distribution planar waveguide 3. This vertically expanded light coupled out of distribution planar waveguide 3 enters the edge of the primary planar waveguide 1. The distribution planar waveguide 3 is sometimes referred to as an orthogonal pupil expander (OPE).

Light entering primary waveguide 1 propagates horizontally (relative to the view of FIG. 6) along the primary waveguide 1 via TIR. As the light intersects with DOE 2 at multiple points as it propagates horizontally along at least a portion of the length of the primary waveguide 10 via TIR. The DOE 2 may advantageously be designed or configured to have a phase profile that is a summation of a linear diffraction pattern and a radially symmetric diffractive pattern, to produce both deflection and focusing of the light. The DOE 2 may advantageously have a low diffraction efficiency (e.g., 10%), so that only a portion of the light of the beam is deflected toward the eye of the view with each intersection of the DOE 2 while the rest of the light continues to propagate through the waveguide 1 via TIR.

At each point of intersection between the propagating light and the DOE 2, a fraction of the light is diffracted toward the adjacent face of the primary waveguide 1 allowing the light to escape the TIR, and emerge from the face of the primary waveguide 1. In some embodiments, the radially symmetric diffraction pattern of the DOE 2 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 1 by a multiplicity of DOEs 2 at different angles, focus levels, and/or yielding different fill patterns at the exit pupil. The planar waveguide 1 is sometimes referred to as an exit pupil expander (EPE). Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of AR Systems

In many implementations, the AR system may include other components in addition to the wearable display system 100. The AR devices may, for example, include one or more haptic devices or components. The haptic device(s) or component(s) may be operable to provide a tactile sensation to a user. For example, the haptic device(s) or component(s) may provide a tactile sensation of pressure and/or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The AR system may, for example, include one or more physical objects which are manipulable by the user to allow input or interaction with the AR system. These physical objects are referred to herein as totems. Some totems may take the form of inanimate objects, for example a piece of metal or plastic, a wall, a surface of table. Alternatively, some totems may take the form of animate objects, for example a hand of the user. As described herein, the totems may not actually have any physical input structures (e.g., keys, triggers, joystick, trackball, rocker switch). Instead, the totem may simply provide a physical surface, and the AR system may render a user interface so as to appear to a user to be on one or more surfaces of the totem. For example, the AR system may render an image of a computer keyboard and trackpad to appear to reside on one or more surfaces of a totem. For instance, the AR system may render a virtual computer keyboard and virtual trackpad to appear on a surface of a thin rectangular plate of aluminum which serves as a totem. The rectangular plate does not itself have any physical keys or trackpad or sensors. However, the AR system may detect user manipulation or interaction or touches with the rectangular plate as selections or inputs made via the virtual keyboard and/or virtual trackpad. The AR system may also include a user input device 504. The user input device may include a trackpad, a touchpad, a trigger, a joystick, a trackball, a rocker switch, a mouse, a keyboard, a multi-degree-of-freedom controller, or other physical input device. The user input device may be used in combination with the totem, body gestures, and eye gestures to interact with the AR system and other users. The user input device 504 can be in wired or wireless communication with the controller 210.

Examples of haptic devices and totems usable with the AR devices, HMD, and display systems of the present disclosure are described in U.S. Patent Publication No. 2015/0016777, which is incorporated by reference herein in its entirety.

Example AR Systems, Environments, and Interfaces

An AR system may employ various mapping related techniques in order to achieve high depth of field in the rendered light fields. In mapping out the virtual world, it is advantageous to know all the features and points in the real world to accurately portray virtual objects in relation to the real world. To this end, field of view images captured from users of the AR system can be added to a world map by including new pictures that convey information about various points and features of the real world. The AR system can collect a set of features (e.g., 2D points) and map points (e.g., 3D points) and may also be able to find new features and map points to render a more accurate version of the world map. The world map of a first user can be communicated (e.g., over a network such as a cloud network) to a second user so that the second user can experience the world surrounding the first user.

Figure 7:
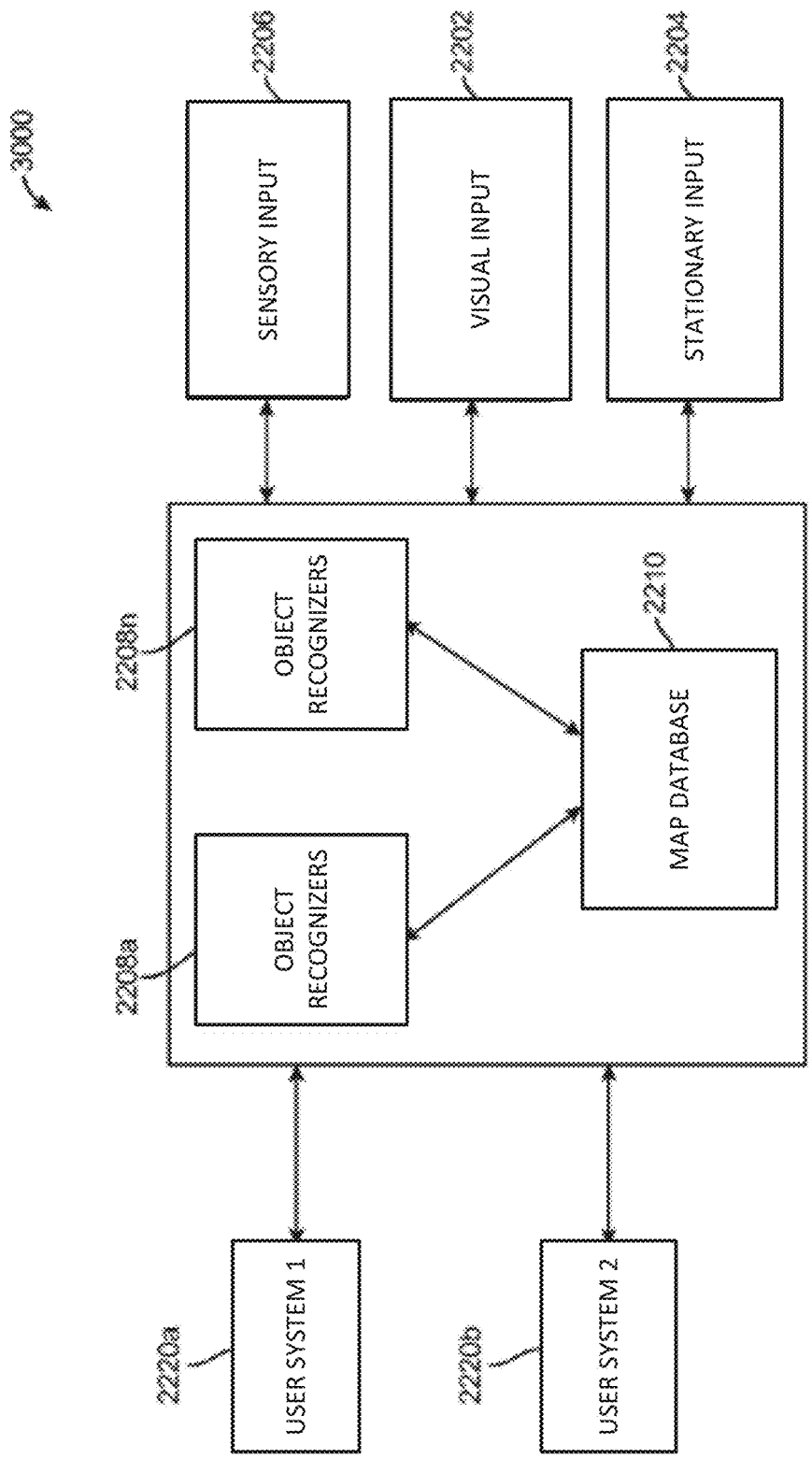
FIG. 7 is a block diagram of an example of an AR system.

FIG. 7 is a block diagram of an example of an AR environment 3000. The AR environment 3000 is configured to receive input (e.g., visual input 2202 from the user's wearable system, input from room cameras 2204, sensory input 2206 from various sensors, gestures, totems, eye tracking, user input from the user input device 504, etc.) from one or more AR systems. The AR systems may comprise one or more user wearable systems (e.g., wearable display system 100) and/or stationary room systems (e.g., room cameras, etc.). The wearable AR systems not only provide images from FOV cameras, they may also be equipped with various sensors (e.g., accelerometers, gyroscopes, temperature sensors, movement sensors, depth sensors, GPS sensors, etc.) to determine the location and various other attributes of the environment of the user. This information may further be supplemented with information from stationary cameras in the room that may provide images and/or various cues from a different point of view. The image data acquired by the cameras may be reduced to a set of mapping points.

One or more object recognizers 2208 can crawl through the received data (e.g., the collection of points) and recognize and/or map points, tag images, attach semantic information to objects with the help of a mapping database 2210. The mapping database may comprise various points collected over time and their corresponding objects. The various devices and the map database can be connected to each other through a network (e.g., LAN, WAN, etc.) to access the cloud.

Based on this information and collection of points in the map database, the object recognizers 2208a to 2208n may recognize objects and supplement this with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more user wearable systems 2220a, 2220b. For example, the AR environment 3000 may transmit information about a scene happening in California to one or more users in New York. Based on data received from an FOV camera and other inputs, the object recognizers and other software components map the points collected from the various images, recognize objects etc., such that the scene may be accurately "passed over" to a second user, who may be in a different part of the world. The environment 3000 may also use a topological map for localization purposes.

The object recognitions may be performed using a variety of computer vision techniques. For example, the wearable system can analyze the images acquired by the outward-facing imaging system 502 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth.

Figure 18B:
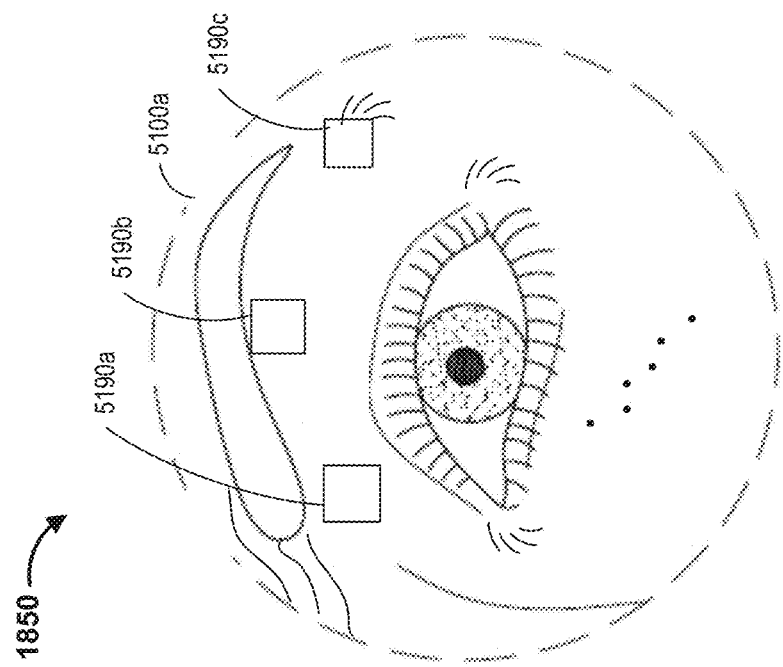
FIGS. 18A and 18B illustrate changes in periocular region features observed with a loosely fitting wearable device.
Figure 18A:
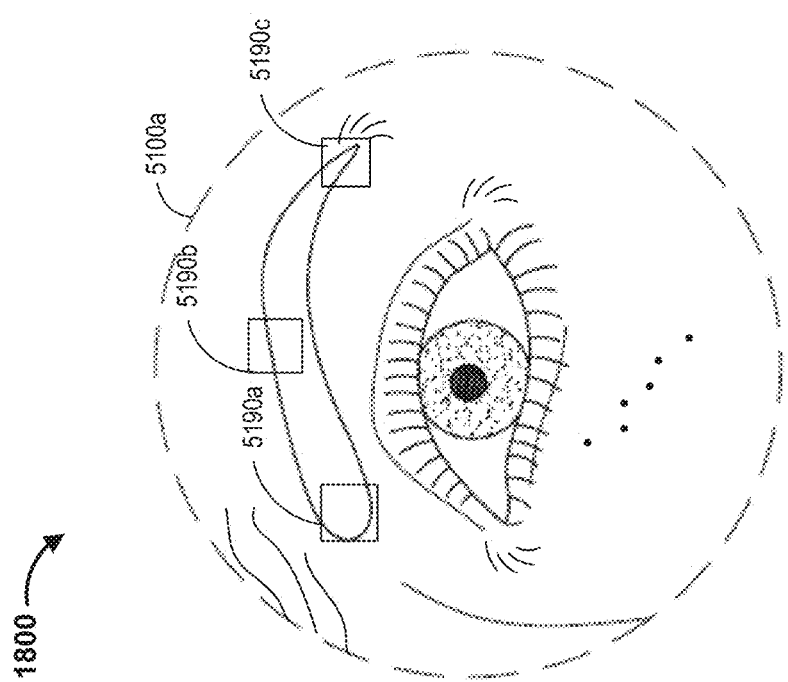

The object recognition may be performed with the inward facing imaging system 500 (shown in FIG. 4), 5060 (shown in FIG. 11), or 5060a (shown in FIGS. 14A, 14B), which can be used to detect and track eye movements, glints from the eye (e.g., reflections of the IR LED 508, 508a, 508b), identify periocular features (e.g., eyebrows 5120a, wrinkles 5160a-d, glints 5170a-d on an eye 5110a, freckles 5180a, upper corners 5190a-c of an eye 5110a, shown in FIGS. 18A, 18B), calculate optical flows of facial features (e.g., FIG. 18C), and so forth.

One or more computer vision algorithms may be used to perform these object recognition tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Figure 8:
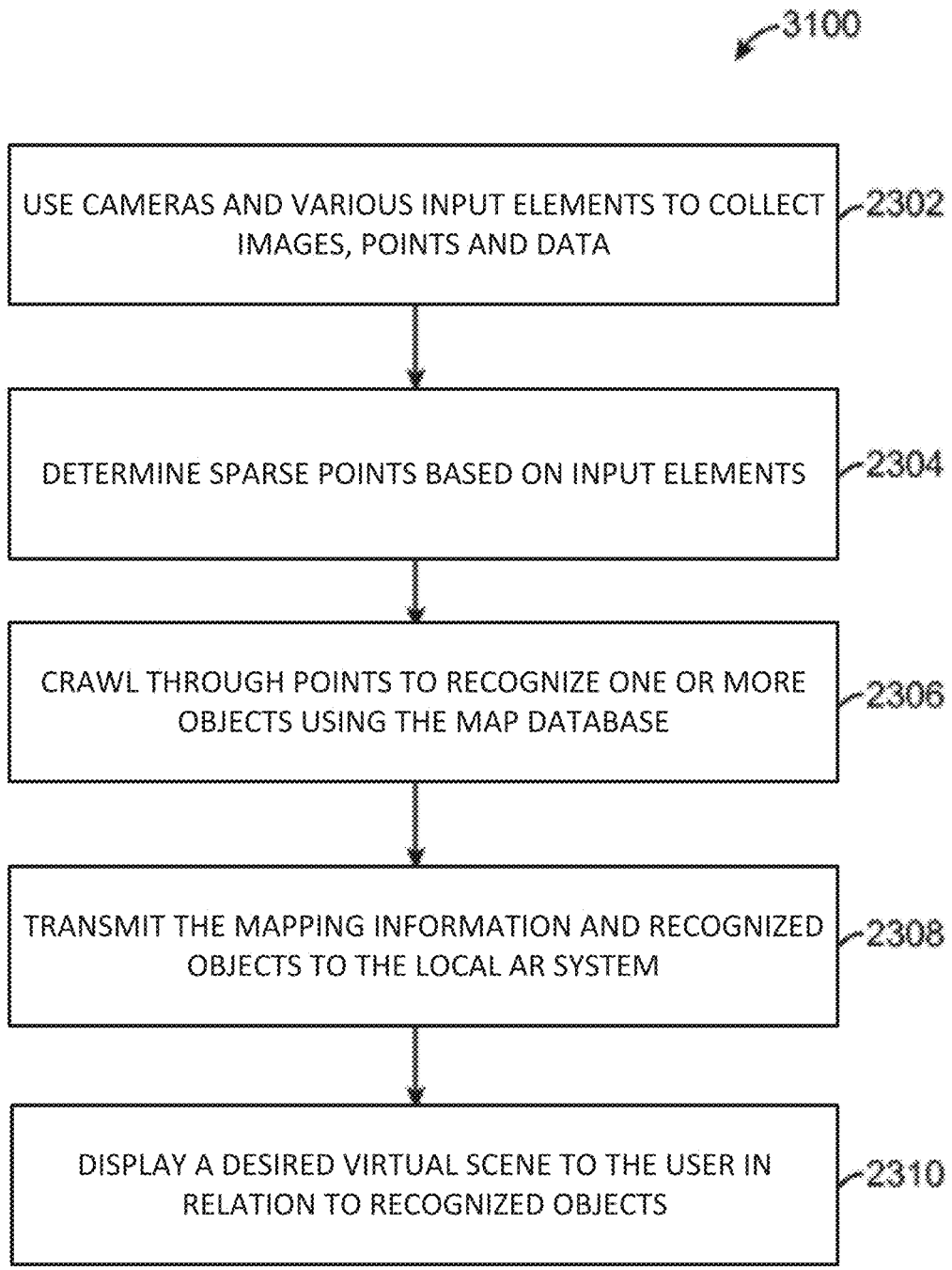
FIG. 8 is a process flow diagram of an example of a method of rendering virtual content in relation to recognized objects.

FIG. 8 is a process flow diagram of an example of a method 3100 of rendering virtual content in relation to recognized objects. The method 3100 describes how a virtual scene may be represented to a user of the AR system (e.g., a wearable display system). The user may be geographically remote from the scene. For example, the user may be New York, but may want to view a scene that is presently going on in California, or may want to go on a walk with a friend who resides in California. At block 2302, the AR system may receive input from the user and other users regarding the environment of the user. This may be achieved through various input devices, and knowledge already possessed in the map database. The user's FOV camera, sensors, GPS, eye tracking, etc., convey information to the system (block 2302). The system may then determine sparse points based on this information (block 2304). The sparse points may be used in determining pose data (e.g., head pose, eye pose, gestures) that can be used in displaying and understanding the orientation and position of various objects in the user's surroundings. The object recognizers 2208a, 2208n may crawl through these collected points and recognize one or more objects using the map database 2210 (block 2306). This information may then be conveyed to the user's individual AR system (block 2308), and the desired virtual scene may be accordingly displayed to the user (block 2310). For example, the desired virtual scene (e.g., user in CA) may be displayed at the appropriate orientation, position, etc., in relation to the various objects and other surroundings of the user in New York.

Figure 9:
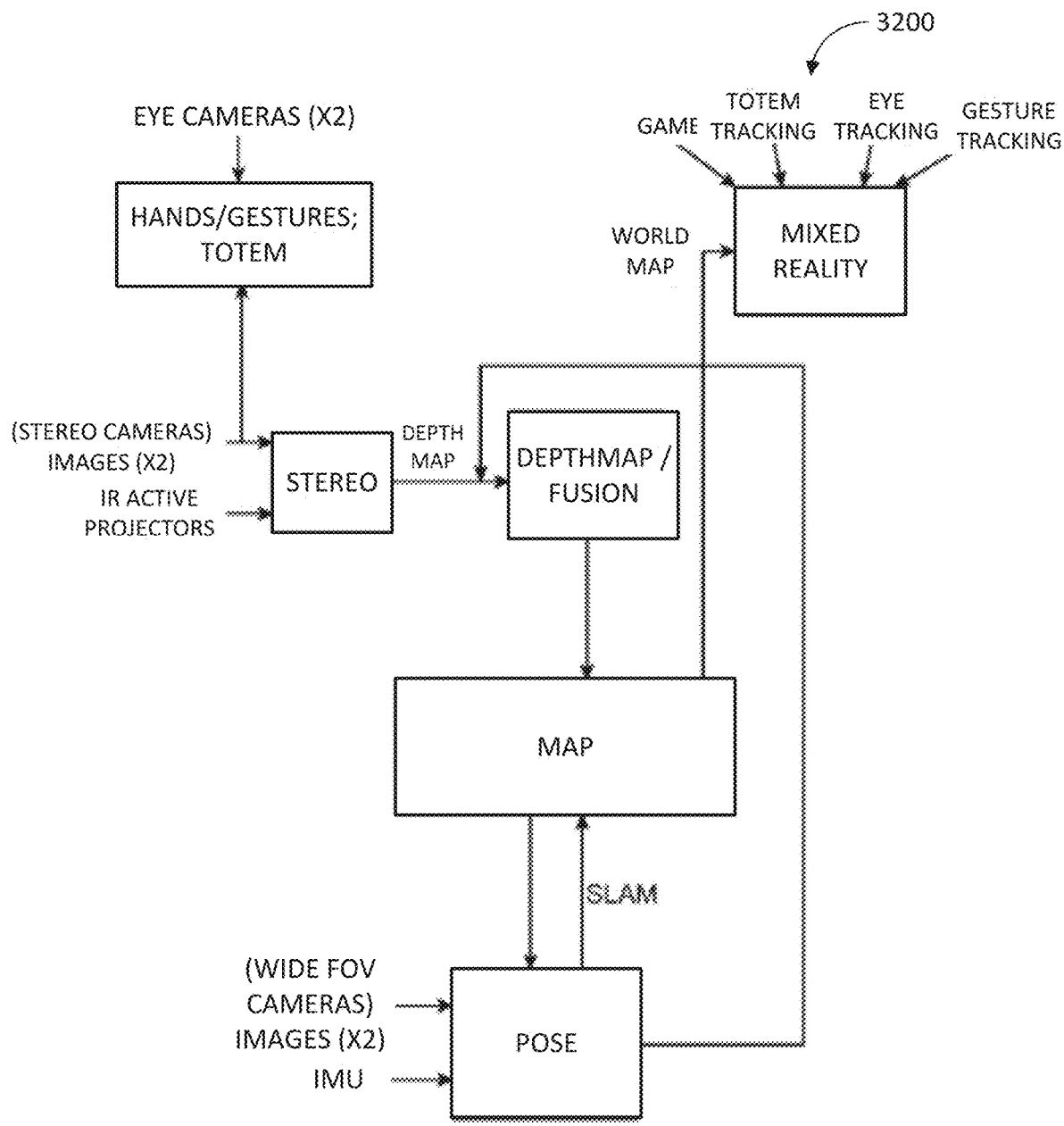
FIG. 9 is a block diagram of another example of an AR system.

FIG. 9 is a block diagram of another example of an AR system 3200. In this example, the system 3200 comprises a Map, which may include the map database 2210 containing map data for the world. In one embodiment it may partly reside on user-wearable components, and may partly reside at networked storage locations accessible by wired or wireless network (e.g., in a cloud system). A Pose process may execute on the wearable computing architecture (e.g., processing module 71 or controller 210) and utilize data from the Map to determine position and orientation of the wearable computing hardware or user. Pose data may be computed from data collected on the fly as the user is experiencing the system and operating in the world. The data may comprise images, data from sensors (such as inertial measurement devices, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out wherein the world the various components are, but what the world is made of. Pose is a building block that achieves many goals, including populating the Map and using the data from the Map.

In one embodiment, a sparse point position may not be completely adequate on its own, and further information may be needed to produce a multifocal virtual or augmented reality experience, which may also be termed Mixed Reality. Dense Representations, generally referring to depth map information, may be utilized to fill this gap at least in part. Such information may be computed from a process referred to as Stereo, wherein depth information is determined using a technique such as triangulation or time-of-flight sensing. Image information and active patterns (such as infrared patterns created using active projectors) may serve as input to the Stereo process. A significant amount of depth map information may be fused together, and some of this may be summarized with a surface representation. For example, mathematically definable surfaces are efficient (e.g., relative to a large point cloud) and digestible inputs to other processing devices like game engines. Thus the output of the Stereo process (e.g., a depth map) may be combined in the Fusion process. Pose may be an input to this Fusion process as well, and the output of Fusion becomes an input to populating the Map process. Sub-surfaces may connect with each other, such as in topographical mapping, to form larger surfaces, and the Map becomes a large hybrid of points and surfaces.

To resolve various aspects in a Mixed Reality process, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The Map may include information regarding where such objects are relative to each other, to be another valuable input to Mixed Reality. The input from the Map to the Mixed Reality process may be called the "World Map". Pose relative to the world becomes an input as well and plays a key role to almost any interactive system.

Controls or inputs from the user are another input to the system 3200. As described herein, user inputs can include visual input, gestures, totems, audio input, sensory input, etc. In order to move around or play a game, for example, the user may need to instruct the system regarding what he or she wants to do. Beyond just moving oneself in space, there are various forms of user controls that may be utilized. In one embodiment, a totem, user input device, or object such as a gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even with such activity is not within the field of view of any of the cameras.)

Hand gesture tracking or recognition may also provide input information. The system 3200 may be configured to track and interpret hand gestures for button presses, for gesturing left or right, stop, grab, hold, etc. For example, in one configuration, maybe the user wants to flip through emails or a calendar in a non-gaming environment, or do a "fist bump" with another person or player. The system may be configured to leverage a minimum amount of hand gesture, which may or may not be dynamic. For example, the gestures may be simple static gestures like open hand for stop, thumbs up for ok, thumbs down for not ok; or a hand flip right or left or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example system 3200 shown in FIG. 9 can include three pairs of cameras: a relative wide field of view or passive SLAM pair of cameras arranged to the sides of the user's face, a different pair of cameras oriented in front of the user to handle the Stereo imaging process and also to capture hand gestures and totem/object tracking in front of the user's face. The system can include an inward-facing imaging system (see, e.g., the imaging system 500 shown in FIG. 4) oriented toward the eyes of the user in order to triangulate eye vectors and other information. The system may also comprise one or more textured light projectors (such as infrared (IR) projectors 508) to inject texture into a scene.

Figure 10A:
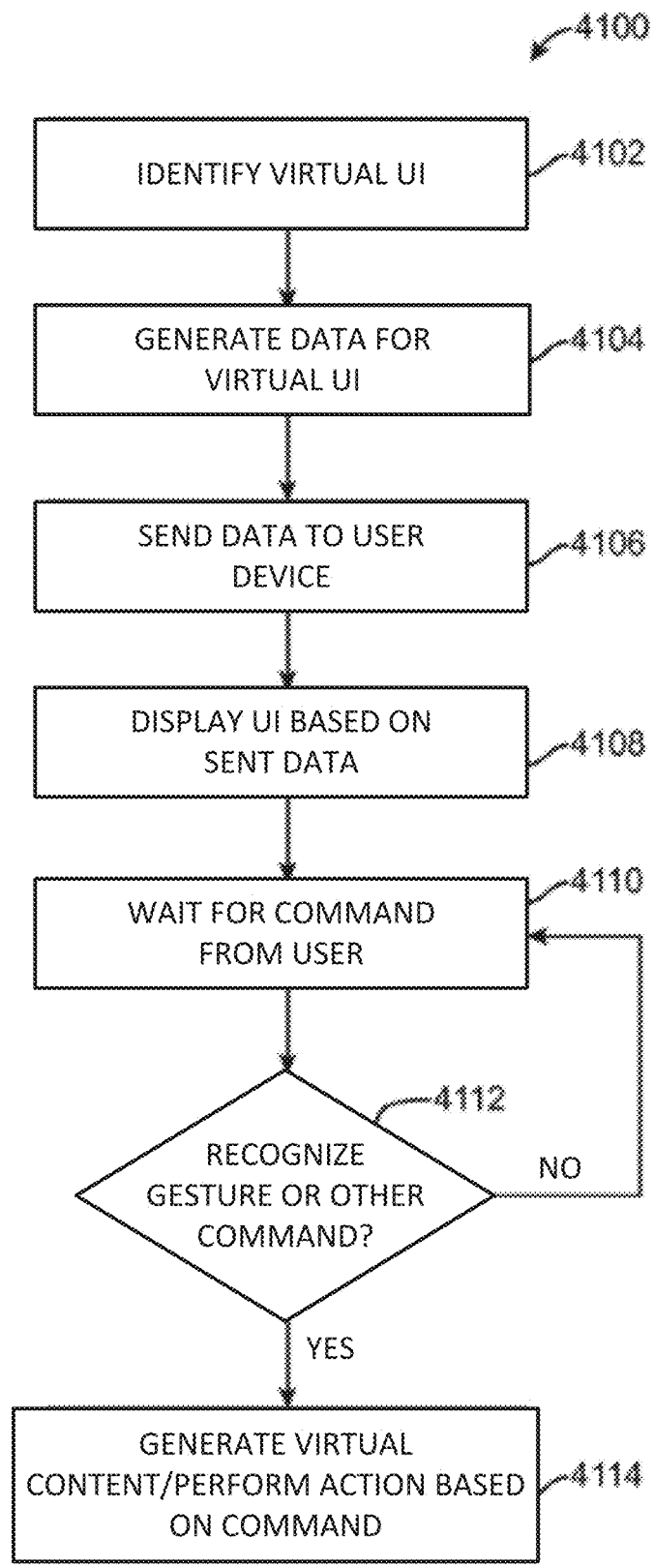
FIG. 10A is a process flow diagram of an example of a method for interacting with a virtual user interface.

FIG. 10A is a process flow diagram of an example of a method 4100 for interacting with a virtual user interface. At block 4102, the AR system may identify a particular UI. The type of UI may be predetermined by the user. The system may identify that a particular UI needs to be populated based on a user input (e.g., gesture, visual data, audio data, sensory data, direct command, etc.). At block 4104, the AR system may generate data for the virtual UI. For example, data associated with the confines, general structure, shape of the UI etc. may be generated. In addition, the AR system may determine map coordinates of the user's physical location so that the AR system can display the UI in relation to the user's physical location. For example, if the UI is body centric, the AR system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 4106, the AR system may send the data to the user's wearable device from the cloud. Or the data may be sent from a local database to the display components. At block 4108, the UI is displayed to the user based on the sent data. For example, a light field display can project the virtual UI into one or both of the user's eyes. Once the virtual UI has been created, the AR system may simply wait for a command from the user to generate more virtual content on the virtual UI at block 4110. For example, the UI may be a body centric ring around the user's body or planar panels in front of or around the user. The AR system may then wait for the command (a gesture, a head or eye movement, input from a user input device, etc.), and if it is recognized (block 4112), virtual content associated with the command may be displayed to the user (block 4114). The virtual content can include an avatar representing the appearance of a wearer of the AR system. The facial expression of the avatar may be rendered to reflect the actual facial movements of the wearer. Some AR systems can utilize the techniques described herein to animate facial expressions of the wearer's lower face (e.g., which is not imaged by an inward-facing, eye-tracking camera of the AR system) based on analysis of images of the periocular region of the wearer's face (e.g., taken by the inward-facing, eye-tracking camera(s)).

FIG. 10B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display 62 of the system 100) or FIG. 11 for representing a virtual avatar of the other user in the telepresence session. The two users can conduct a telepresence session using the wearable device. Note that the vertical line in FIG. 10B separating the two users is intended to illustrate that Alice 912 and Bob 914 may (but need not) be in two different locations while they communicate via telepresence (e.g., Alice may be inside her office in Atlanta while Bob is outdoors in Boston).

The wearable devices 902 and 904 may be in communication with each other or with other user devices and computer systems. For example, Alice's wearable device 902 may be in communication with Bob's wearable device 904, e.g., via a network. The wearable devices 902 and 904 can track the users' environments and movements in the environments (e.g., via the respective outward-facing imaging system 502, or one or more location sensors) and speech (e.g., via the respective audio sensor 69). The wearable devices 902 and 904 can also track the users' eye movements or gaze based on data acquired by the inward-facing imaging system 500. In some situations, the wearable device can also capture or track a user's facial expressions or other body movements (e.g., arm or leg movements) where a user is near a reflective surface and the outward-facing imaging system 502 can obtain reflected images of the user to observe the user's facial expressions or other body movements (e.g., during a personalization session that will be described with reference to FIG. 22).

A wearable device can use information acquired of a first user and the environment to animate a virtual avatar that will be rendered by a second user's wearable device to create a tangible sense of presence of the first user in the second user's environment. For example, the wearable devices 902 and 904, the remote processing module 72, alone or in combination, may process Alice's images or movements for presentation by Bob's wearable device 904 or may process Bob's images or movements for presentation by Alice's wearable device 902. As further described herein, the lower facial regions of the avatars can be rendered to reflect actual facial movements of Alice or Bob. For example, the inward-facing imaging system 500 can acquire images of the periocular region (around the eyes), and the expression of the lower facial region (e.g., including the lips and mouth) can be determined from analysis of the periocular images. Accordingly, a full facial image of Alice or Bob can be generated and used to render the respective avatar, so that the facial expressions of Alice and Bob appear lifelike and realistic to each other during the telepresence session.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Additional details relating to telepresence systems and utilizing mirrors to obtain images of a wearer of an AR device (see, e.g., description of personalization with reference to FIG. 22 below) are described in U.S. Patent Pub. No. 2017/0206691, which is hereby incorporated by reference herein in its entirety.

Additional examples of AR systems, UI, and user experiences (UX) are described in U.S. Patent Publication No. 2015/0016777, which is incorporated by reference herein in its entirety.

Examples of a Wearable Device

Figure 11:
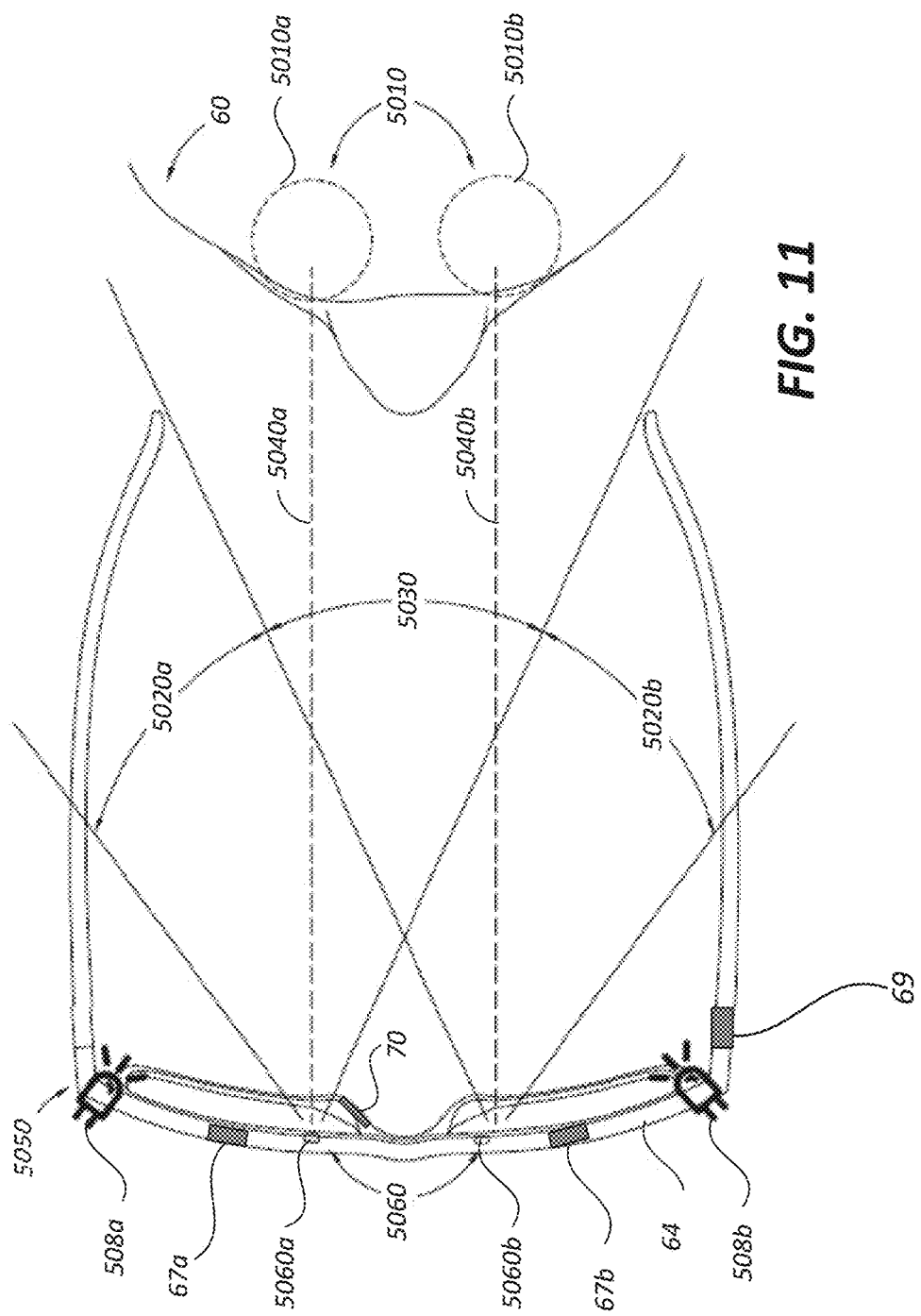
FIG. 11 illustrates an example wearable display system which can acquire images of the user's face.

FIG. 11 illustrates an example wearable device which can acquire images of a wearer's facial features. The wearable device may be a head-mounted device (HMD) that is configured to display AR, VR, and/or MR contents. The images acquired can include still images, individual frames from a video, or a video.

The wearable device 5050 in FIG. 11 may be an embodiment of the display system 100 described with reference to FIG. 2. The wearable device 5050 can include an imaging system 5060 which can be configured to image the user's 60 face. The imaging system 5060 may be an embodiment of the inward-facing imaging system 500 shown in FIG. 4. For example, the imaging system 5060 may include sensors such as eye cameras (eye camera 5060a and eye camera 5060b) configured to image the periocular region of the user's eyes 5010 while the user 60 is wearing the wearable device 5050.

Each eye camera may have a field-of-view (FOV). For example, the FOV for the eye camera 5060a can include the region 5020a and the region 5030. The FOV for the eye camera 5060b can include the region 5020b and the region 5030. The FOV of the eye camera 5060a and the FOV of the eye camera 5060b may overlap at the region 5030. The eye camera may be an ET camera (eye-tracking camera).

As shown in FIG. 11, the imaging system 5060 points toward the head of the user 60. The eye camera 5060a may be configured to image the eye 5010a while the eye camera 5060b may be configured to image the eye 5010b. In this figure, the optical axis 5040a of the eye camera 5060a is parallel to the optical axis 5040b of the eye camera 5060b.

In some implementations, one or both of the eye cameras may be rotated such that the optical axes of the two eye cameras are no longer in parallel. For example, the two eye cameras may point slightly towards each other. This implementation may be advantageous because it can create a cross eyed configuration which can increase the overlap of the FOV between the two cameras as well as to allow the two eye cameras to image the face at a closer distance.

Although the example described in FIG. 11 illustrates two eye cameras, wearable device 5050 is not required to have two eye cameras. In some embodiments, the imaging system 5060 may include one eye camera imaging the periocular region of the user's face. The one eye camera may be configured to image one eye or both eyes. In other embodiments, the wearable device 5050 may include more than two eye cameras, where one or more of the eye cameras may have an overlapping FOV.

In some embodiments, the wearable device 5050 may also include one or more microphones 69 (at least two microphones if stereo/shaping of audio inputs), one or more IR LEDs 508a and 508b, or one or more photoreflective sensors 67a and 67b. The photoreflective sensors may be coupled to the frame 64 and positioned toward the user inside the curvature of the frame 64. The photoreflective sensors can observe the amount of light reflected from the skin and detect changes in light intensity received. When photoreflective sensors measure light intensity in a facial region with known amount of provided light (e.g., from the IR LEDs 508a and 508b), changes in the light intensity can indicate changes in distance from the photoreflective sensors. In other words, the photoreflective sensor measurements can be used to determine distance from fixed components (e.g., ET camera) in the HMD to the skin. The change in distance in turn can indicate changes of facial features in relation to changes in facial expressions. The inward-facing imaging systems 500 (shown in FIG. 2) captures images of periocular regions, as discussed in the next section.

In some embodiments, the wearable device 5050 includes one or more electrooculography (EOG) sensors 70 coupled to the frame near the nosepiece to provide the wearable device with measurements of the corneo-retinal standing potential (which provides information on eye movements) that exists between the front and the back of the human eye. The EOG sensor can provide electrophyisiological measurements of muscles around the eye, and these measurements can be used to determine movements of the skin near the eye(s).

Examples of a Periocular Region

Figures 12A, 12B:
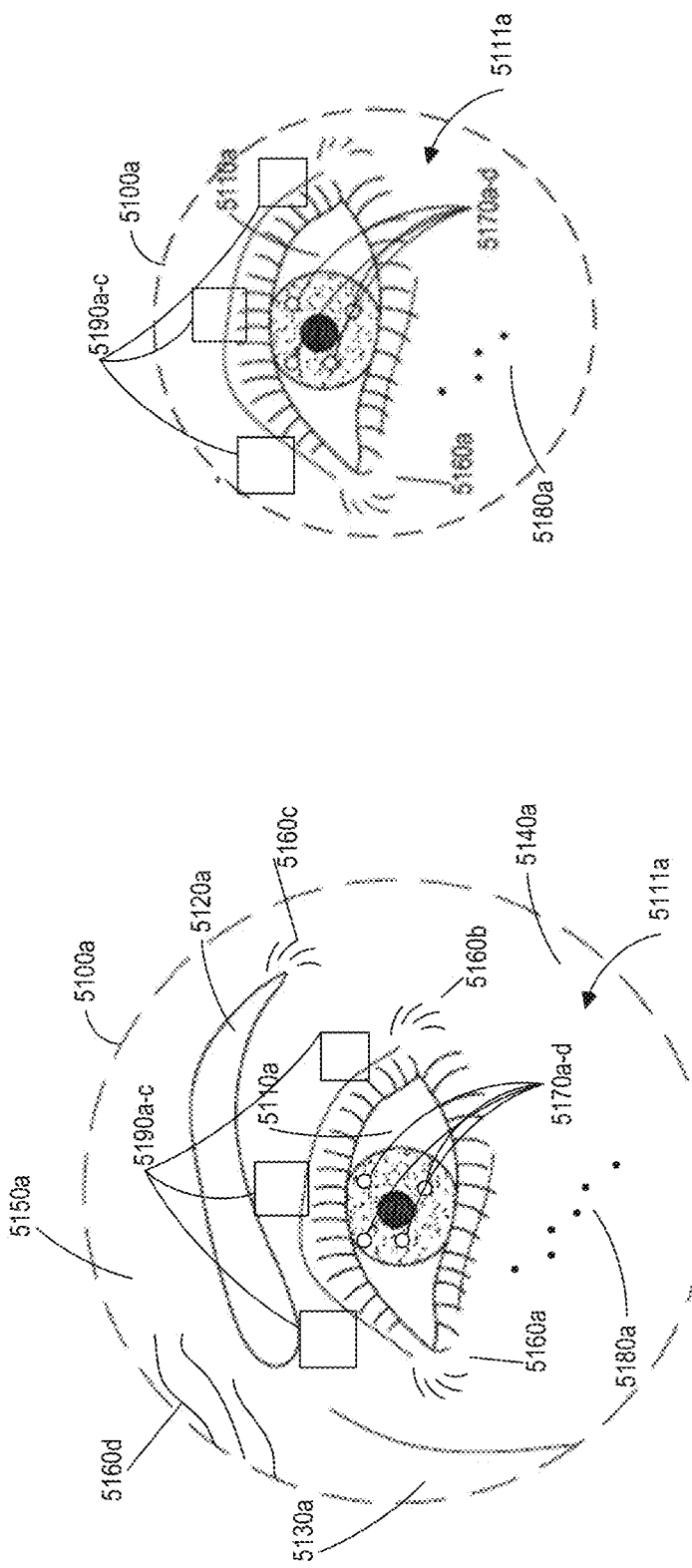
FIG. 12A-12B illustrates example images of a periocular region of an eye and various ocular and periocular features.

The periocular region can include the eyes and the regions around the eyes. FIG. 12A illustrates an example image of a periocular region for one eye. In this example, the periocular region 5100a can include an eye 5110a (such as an eye socket) and a region 5111a around the eye 5110a. The periocular region 5110a may include, for example, an eyebrow 5120a, portions of the nose 5130a, cheek 5140a, and forehead 5150a. The periocular region, however, may exclude the mouth or the portion of the nose that is far away from the eye. There are various features in the periocular region 5100a that may be of interest to the system, including muscles (not shown), eyebrows 5120a, wrinkles 5160a-d, glints 5170a-d on an eye 5110a, freckles 5180a, upper corners 5190a-c of an eye 5110a, or other features. These features may be extracted (e.g., via the object recognizers 2208a-2208n) and processed to indicate changes in facial expressions, singularly or in combination with other features. In some implementations, the periocular region may be represented by key points, point clouds, vectors, matrices, or other types of mathematical representations.

With reference to FIGS. 12A and 12B, an upper periocular region generally refers to the above-the-pupil portion of the periocular region 5100a including upper eyelid, eyebrow 5120a and upper patches 5190a-c, while a lower periocular region generally refers to below-the-pupil portion of the periocular region 5100a including lower eyelid.

The portion of the periocular region captured by an eye camera may depend on the eye camera's FOV or the distance of the frame 64 of the wearable device 5050 from the face of the wearer 60. For a tightly fitting device, the eye camera is closer to the face and the FOV of the camera may be smaller than for a more loosely fitting device, where the frame 64 is farther away from the face of the wearer 60. In some implementations, the eye camera may not have a large FOV to capture the entire periocular region. As FIG. 12B illustrates, depending on the scope of FOV, some of the above features shown in FIG. 12A may not be visible. For example, when a narrower periocular region 5100a is observed by ET camera 5060a, which may be the result of a tighter fit of the wearable device on the user (compared to the looser fit illustrated in FIG. 12A) or a more closely positioned ET camera, some of the features previously available may have been excluded. Such excluded features from the tight fit might be the forehead 5150a, eyebrow 5120a, eyebrow wrinkles 5160c, forehead wrinkles 5160d, portions of the nose 5130, etc. According to certain embodiments, the FOV of the ET camera is selected so that the eye camera images an eye 5110a and its surroundings (e.g., periocular region). The wearable display system 100 may flexibly adjust the scope of periocular region observed based on the observed area and visible features. As described herein, conformations of the eye and the surroundings taken together may provide significant indicators of the changes in facial expressions of the observed user.

Examples of Associations in Changes in Periocular Region and Facial Expressions

In the contexts of face recognition, synthesis, and rendering, the human face may be represented using 3D modeling techniques, such as triangular meshes, parametric surfaces, linear space representations, or other mathematical representations. As one example, the 3D model may be built using a deformable linear model (DLM). The DLM can encode the state of deformations of the face with a list of vectors. The deformation vectors may be associated with a neutral face, making a nose bigger, making a mouth narrower, or making a face more feminine, etc. The deformation vectors may also be associated with changes in facial expressions from smiling, scowling, or frowning, etc. Given the strength of the changes in facial features (such as laughing out loud or gently smiling), the deformation vectors may be scaled by a strength value relative to the neutral face mesh. For example, the strength value may be bigger if the person laughs out loud because the person may have more facial movements and therefore bigger deformation with respect to the neutral face. On the other hand, the strength value may be smaller if the person smiles gently because there may not be many facial movements. Although DLM models can be used, the present disclosure is not limited to DLM models, and in other embodiments, active shape models (ASM), active appearance models (AAM), morphable models (M), or any other two-dimensional (2D) or 3D shape or texture model may be used.

A portion of the face model may describe features in the lower face of the user such as jaw shapes, jaw movements, etc. The conformations of the lower face in the face model may change as the user interacts with one or more people or various content in the AR environment. For example, when a user intently focuses in the interactions, the user's lip often stretches. When a user has encountered something unexpected, the user's mouth may open aghast to show surprise. When a user is skeptical of the received information, the user's lips may tighten (e.g., become pursed). The lower face conformations may vary in degrees depending on the expression or expressiveness. For example, a content or satisfied user may display a grin whereas an excited user may display a grin with an open mouth.

These natural expressions or reactions are often expressed with the whole face and such lower face conformations may be associated with changes in other parts of the face. One such other part of the face is the periocular region. For example, the intent focusing which manifests with stretched lips of the lower face conformation may also manifest itself with squinting of the eyes. An encounter of something unexpected may manifest with wide opening of the mouth and the eyes. Thus, the periocular region may provide valuable cues in distinguishing satisfaction from excitement by observing and detecting changes in cheek muscles (e.g., a grin from satisfaction may not stretch those muscles while excitement does). For example, skepticism may be associated with the center of the eyebrows moving lower and toward center, not unlike forming a frown. However, skepticism and a frown may be distinguished based on the fact that skepticism may manifest by having one eyebrow adjustment showing greater positional displacement than that of the other eyebrow adjustment, whereas a frown may not. As yet another example, satisfaction, which may be manifest with a lower face conformation including a grin, may also be manifest with a lower portion of the eye corner moving up slightly while excitement may be manifest by the lower portion of the eye corner moving up in greater extent. In some instances, facial expressions may be differentiated by degrees of changes. For example, laughter may be distinguished from a simple grin based on greater muscle and eye shape changes associated with laughter.

As described with reference to FIGS. 12A and 12B, the periocular region includes various features including eyebrows, freckles, and wrinkles. Muscles and muscle flow may be observed by themselves or additionally through movements of features such as freckles and wrinkles. Various sensors described with regard to FIG. 2 and FIG. 11 may obtain information related to such periocular features, object recognizers can analyze the sensor data and extract information of such periocular features, and provide the imaging system 500 with accurate associations between the changes of periocular region and the lower face conformations. The list of features and observing sensors are not to be considered limiting but may be expanded as deemed necessary to increase accuracy and precision of such associations.

As described herein, although the HMD may not be able to obtain all of the updates in the facial expressions of the user by direct measurement when the user is wearing an HMD (e.g., because an inward-facing ET camera typically cannot image the lower face such as, e.g., the region below the periocular region), the HMD can use an inward-facing imaging system 500 to observe the user's periocular features and infer changes in other regions. As further described with reference to FIGS. 22 and 24, the HMD can use a machine learning derived model to map the observed periocular features with parameters for the lower face. These upper and lower face parameters, together with the parameters derived from the periocular images, may be used to synthesize a full face image of the user.

Example System Overview

Figure 13:
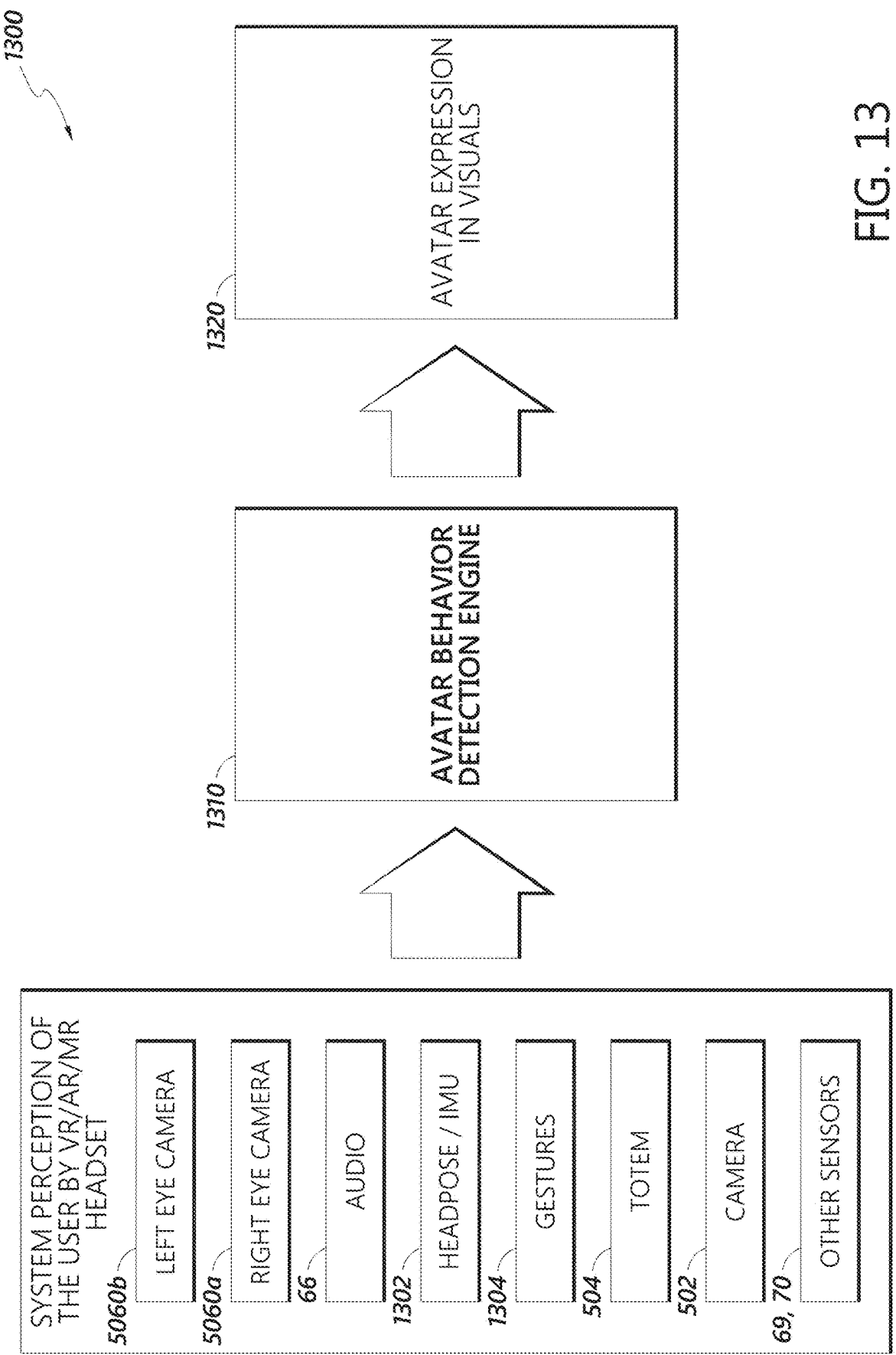
FIG. 13 illustrates an example system for inferring facial expressions from various sensor inputs and applying the expression to an avatar.

FIG. 13 illustrates an overview of an example system 1300 configured to infer facial expressions of an avatar from various sensor inputs. The system can correlate various feature changes of the periocular region with changes of lower face conformation. With various observations and detections made by the various sensor components included in the wearable device 5050, the wearable display system 100 perceives various aspects of the user in real-time. For example, the left eye camera 5060b and right eye camera 5060a can observe the periocular regions 5100a-b of the user's face, respectively. The example system 1300 is intended to be illustrative and not to limit the scope of the facial expression inference technology described herein.

The wearable device 5050 provides the periocular features extracted from the region to an avatar behavior detection engine 1310, which may perform temporal or expression consistency checks. An example of temporal consistency check may include comparing previous frames (e.g., image frames from the cameras) and a time history of extracted/processed features with real-time extracted features to determine whether there is a consistent change toward or away from the user's identified expression. An example of expression consistency may include whether the extracted features are in line with known features of the user according to the user's profile, face model, context, and/or content. Accordingly, the avatar behavior detection engine 1310 can provide robust and real-time assurance of fidelity of behavior measurement. The avatar behavior detection engine 1310 can be implemented by a hardware processor and non-transitory memory, such as in the local processing and data module 71 or the remote processing module 72 and remote data repository 74.

The engine 1310 may also perform additional behavior checks with inputs provided from other sensors, such as headpose 1302 (detected with IMUs), gestures 1304, totems 1306, and/or other sensors including microphone 69 and EOG sensors 70. In some embodiments, one or more microphones 69 may pick up voice of the user and determine that the user is in communication with another party. In one instance, the avatar behavior detection engine 1310 may determine that the voice input was a growl and the observed squinting of the eyes is consistent with the growl. In another instance, the engine 1310 may determine that the voice input is laughter and thus is inconsistent with the squinting of the eyes. When such inconsistency is found, the engine 1310 may resolve inconsistencies by employing various schemes and structures prioritizing one behavior construction over another to provide consistency.

Once the avatar behavior detection engine 1310 determines proper avatar behavior, the avatar facial expression engine 1320 may generate visuals (or, where only facial parameters are transferred to another party's display device, generate visual facial parameters) of the user avatar by synthesizing periocular features with lower face conformation for full expressions. The avatar expression engine 1320 may ensure fidelity of the visuals by, for example, making ensuring adequate translation of signals and transitions into blendshapes (allowing a single mesh to deform to achieve numerous pre-defined shapes and any number of combinations of in-between these shapes, such as morphing a neutral face model to accurately reflect detected facial expressions). The avatar facial expression engine 1320 can be implemented by a hardware processor and non-transitory memory, such as in the local processing and data module 71 or the remote processing module 72 and remote data repository 74.

Examples of Determining Fit of HMD: Scope of Periocular Region

Figure 14A:
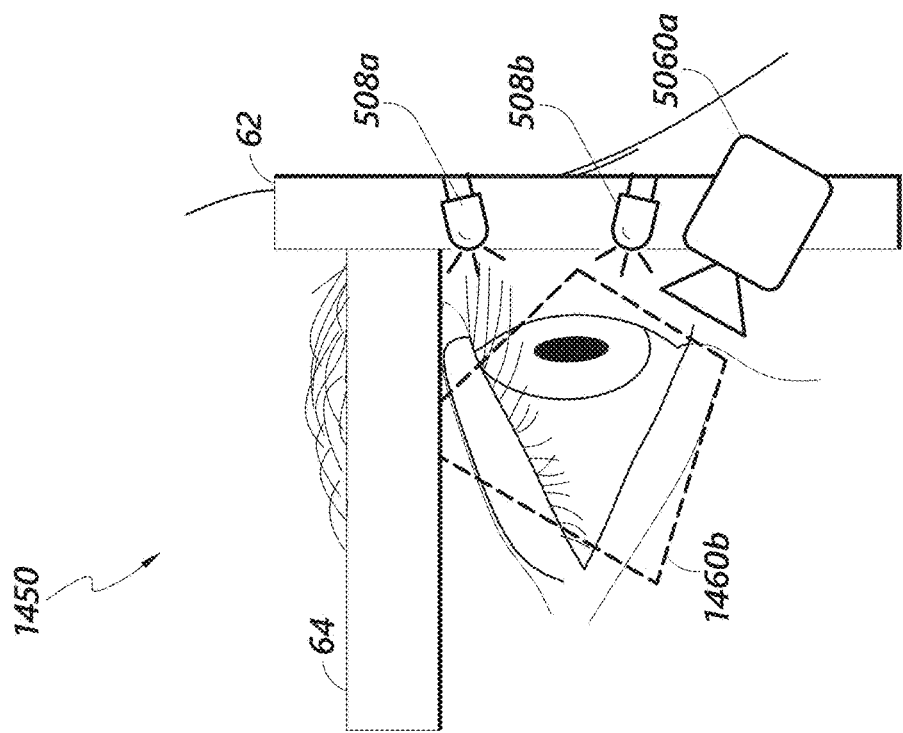
FIGS. 14A and 14B illustrates examples of loosely fitting and tightly fitting wearable display systems, respectively.
Figure 14B:
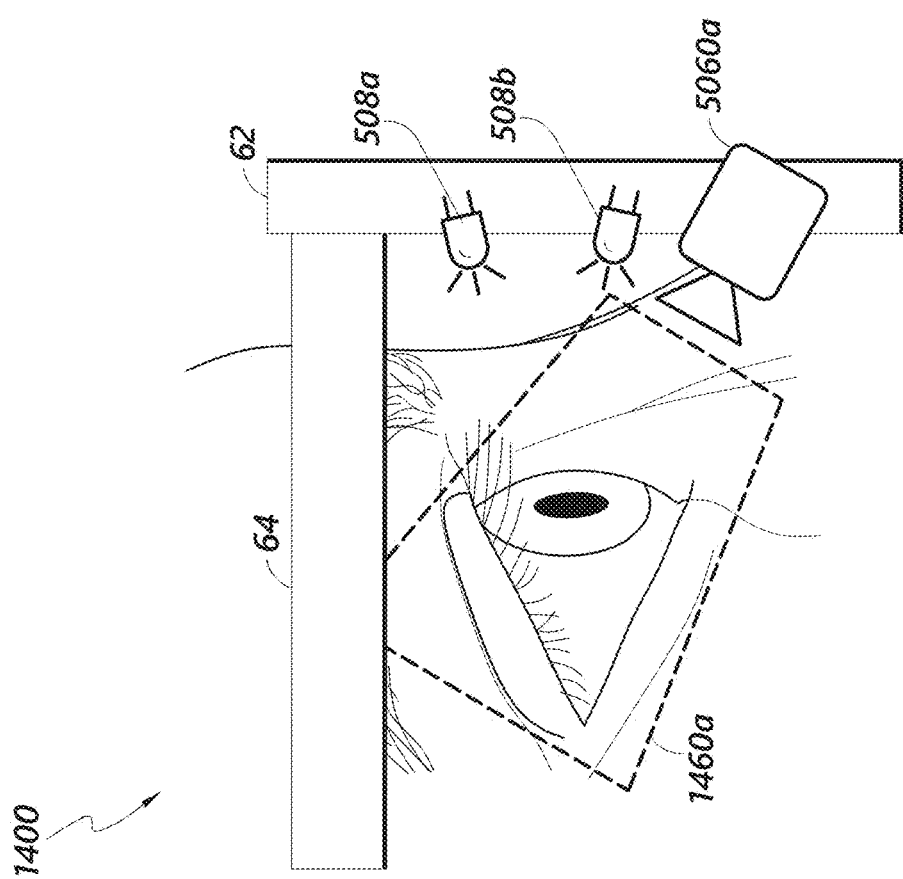

FIG. 14A-14B illustrate examples of HMDs (e.g., the wearable device 5050) that are fit loosely or tightly, respectively, on a wearer. FIG. 14A illustrates an example of a loosely fitting device 1400. The frame 64 and the display 62 are positioned such that the ET camera 5060a has a wider FOV (shown by dashed lines 1460a) of the periocular region 5100a. One or more IR LEDs 508a and 508b are positioned such that they are inward-facing toward the periocular region. Generally, when an HMD is loosely fitting, eyebrow movements do not move (e.g., raise or lower) the HMD significantly. Accordingly, the ET camera 5060a 'sees' a wider range of the periocular region (e.g., have wider FOV) for the loosely fitting device and the eyelids may be observed.

In contrast, FIG. 14B illustrates an example of a tightly fitting device 1450. The frame 64 and the display 62 are positioned such that the ET camera 5060a has a narrower FOV (shown by dashed lines 1460b) of the periocular region 5100a. Generally, when an HMD is tightly fitting, eyebrow raises lift up the HMD and the eyebrow lowering moves the HMD back to its original neutral position. The ET camera 5060a 'sees' a narrower range of the periocular region (e.g., smaller FOV compared to a loose fit), and is more focused on the eye and only little area around it, possibly to the exclusion of an eyebrow.

As can be seen from FIGS. 14A and 14B, the display 62 of a tightly fitting device is closer to the user's face than the display in a loosely fitting device. Whether device fit is loose or tight can be determined in various ways. For example, an IMU on the device can detect whether the HMD moves up and down in parallel to up and down movements of the eyebrow, which would indicate a tight fit. If no such device movement is detected (when the eyebrows move), the HMD can determine the fit is loose. As another example, whether the HMD has a tight or loose fit can be determined by measurement of the size of the FOV of the eye tracking cameras 5060a. For example, the FOV can include the eye and eyelids for a loose fit, but the FOV can include the eye but little of the surrounding region for a tight fit. In various embodiments, a tightly fitting display is in a range from 0.5 cm to 1.5 cm from the wearer's face (e.g., between an inner surface of the display and the front of an eyeball), and a loosely fitting display is in a range from 1.5 cm to 5 cm from the wearer's face (e.g., between an inner surface of the display and the front of an eyeball). As described herein, the distance between the device and the face can be measured, e.g., with photoreflective sensors or eye-tracking camera measurements of reflectivity of an IR LED.

Figure 15:
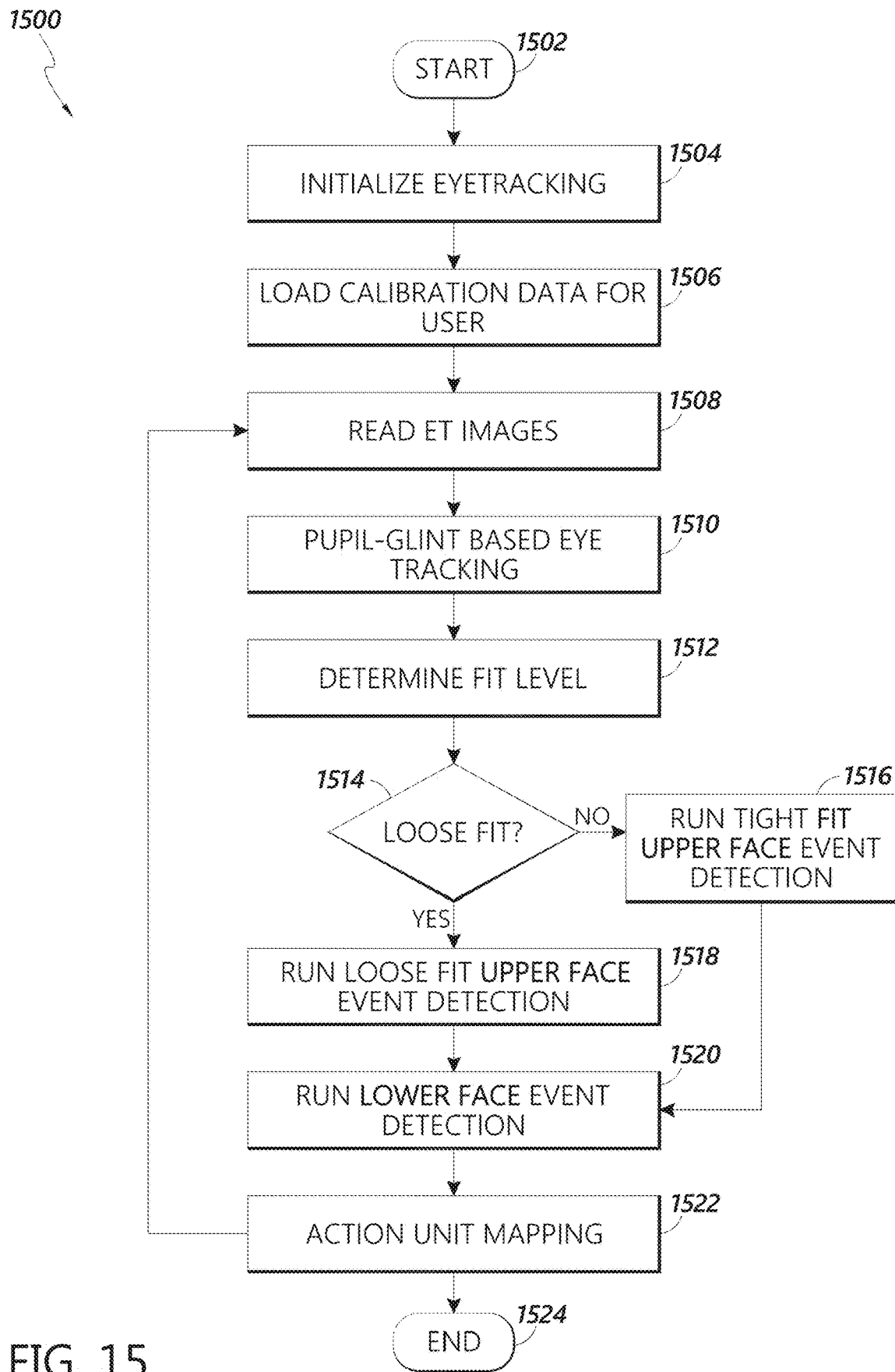
FIG. 15 is a process flow diagram of an example method for determining a fit level of a wearable display system.

A fit level of the HMD, whether it is loose or tight, may be determined by the system at initial configuration or in run-time. FIG. 15 illustrates an example process flow diagram of an example method 1500 for determining a fit level of the HMD. The method 1500 can be implemented by a hardware processor and non-transitory memory, such as in the local processing and data module 71 or the remote processing module 72 and remote data repository 74.

Block 1502 is the start of the method 1500. At block 1504, the system initializes one or more eye tracking cameras 5060a-b. At block 1506, if user-specific data exists and the user can be identified, the system retrieves calibration data for a specific user. At block 1508, the ET camera 5060a obtains one or more images of a periocular region of an eye of the user.

At block 1510, the system extracts pupil-glint information. The pupil-glints (shown in FIG. 12A-12B, 5170*a-d*) are corneal reflections of light sources (e.g., an IR light source, such as IR LED 508, 508*a*, 508*b* directed toward the eye), which may provide information on the direction a user is gazing. In some embodiments, the gaze tracking with pupil-glints may provide information on the boundaries of the gaze (e.g., extent of eye movements) that is helpful in determining a fit level. In other words, where the boundary of the gaze is restricted to a smaller area, it may indicate a tight fit and where the boundary of the gaze is restricted to a larger area, it may indicate a loose fit. In some instances, the association between gazes and resulting movements (e.g., raise or lowering) of the HMD may indicate a fit level. For example, full gaze movements with small or no HMD movement may indicate a loose fit, whereas full gaze movements with a measurable amount of corresponding HMD movement (e.g., than about 1 mm, 2 mm, or more) may indicate a tight fit level. In some embodiments, the locations of the pupil-glint itself may be helpful in the determination of a fit in a way that locations of the glints are compared against expected locations of the glints for a tight or loose fit.

In some embodiments, one or more electrooculography (EOG) sensors 70 (e.g., shown in FIG. 2 or FIG. 11) may supplement or replace glint-based eye movement tracking of ET cameras 5060*a-b* and provide eye movement information. The EOG sensors measure the corneo-retinal standing potential that exists between the front and the back of the human eye, which provides accurate information of eye movements.

At block 1512, based on the above described observations, a fit level is determined. At block 1514, if the determined fit in block 1512 is a loose fit, the system executes block 1518 procedures related to loose fit upper periocular region event detection (e.g., further described with reference to FIGS. 18A-18B and 19). If the determined fit is a tight fit, the system instead proceeds to block 1516 to execute procedures related to tight fit upper periocular region event detection (e.g., further described with reference to FIGS. 16A-16C and 17). At block 1520, the system executes lower face event detection (e.g., further described with reference to FIG. 19).

At block 1522, the system synthesizes upper periocular region event and lower face event to generate facial expressions for at least a portion of the face. In some implementations, the method calculates action units (AU) of a facial taxonomy system (such as, e.g., the facial action coding system (FACS)). For example, FACS classifies observable facial expressions based on the appearance of a person's face by decomposing the facial expressions into isolated muscle contractions or relaxations. Each isolated muscle contraction or relaxation of FACS is associated with a numerical representation, referred to as an Action Unit (AU). The FACS AUs can be used by the avatar behavior detection engine 1310 or the avatar expression engine 1320 to generate a facial image used for rendering an avatar. In some cases, the FACS AUs can be used to generate blendshapes that are used to render or morph a facial image.

The method 1500 then returns to obtain new periocular images (if any) at block 1508. The tight fit upper periocular region event detection 1506 and loose fit upper periocular region event detection 1508 are further described in the following sections.

Examples of Tight Fit Periocular Region Movement Detection

Figure 16A:
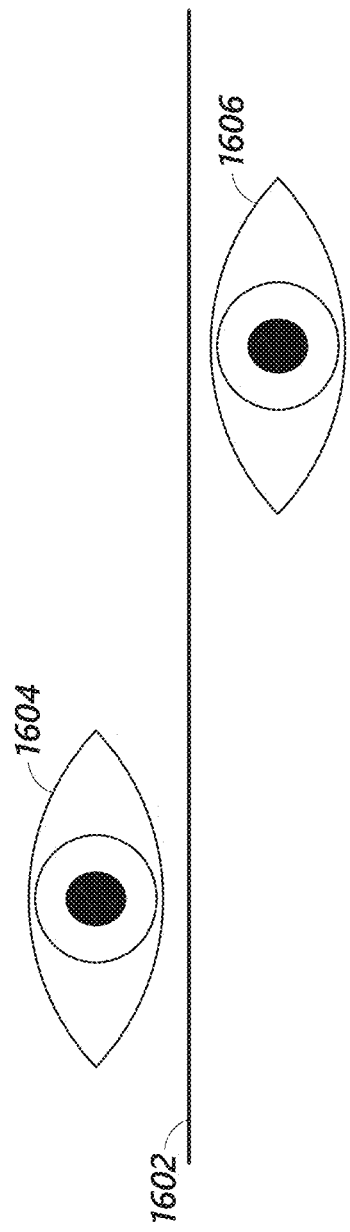
FIG. 16A-16C illustrate changes in periocular region features observed with a tightly fitting wearable device.
Figure 16B:
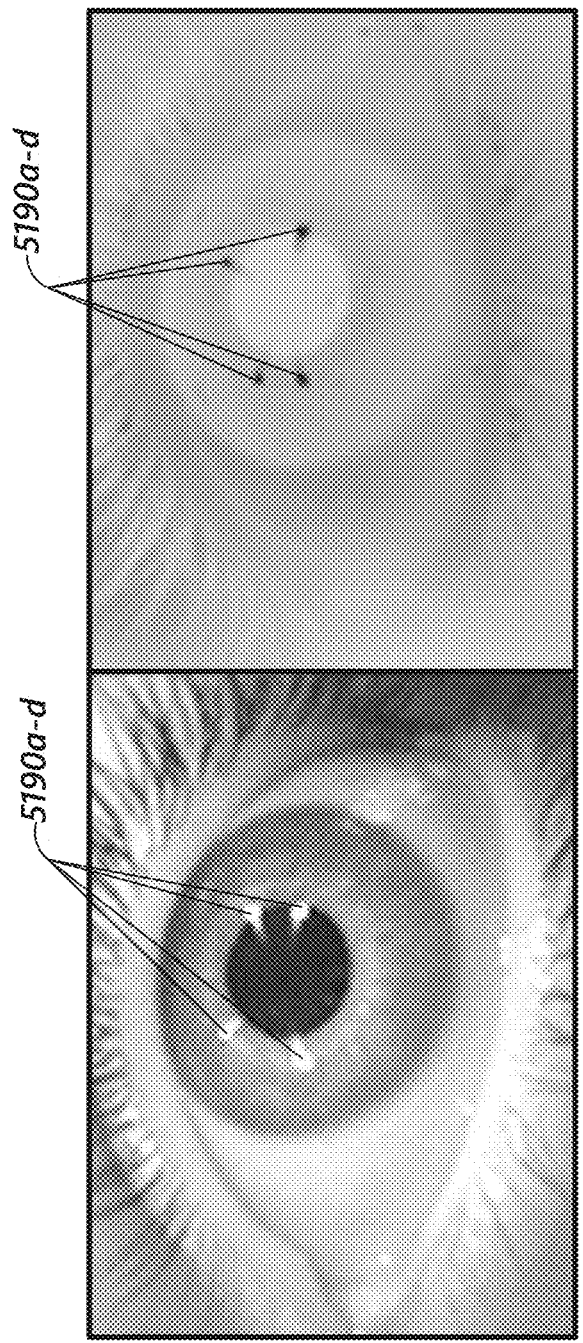
Figure 16C:
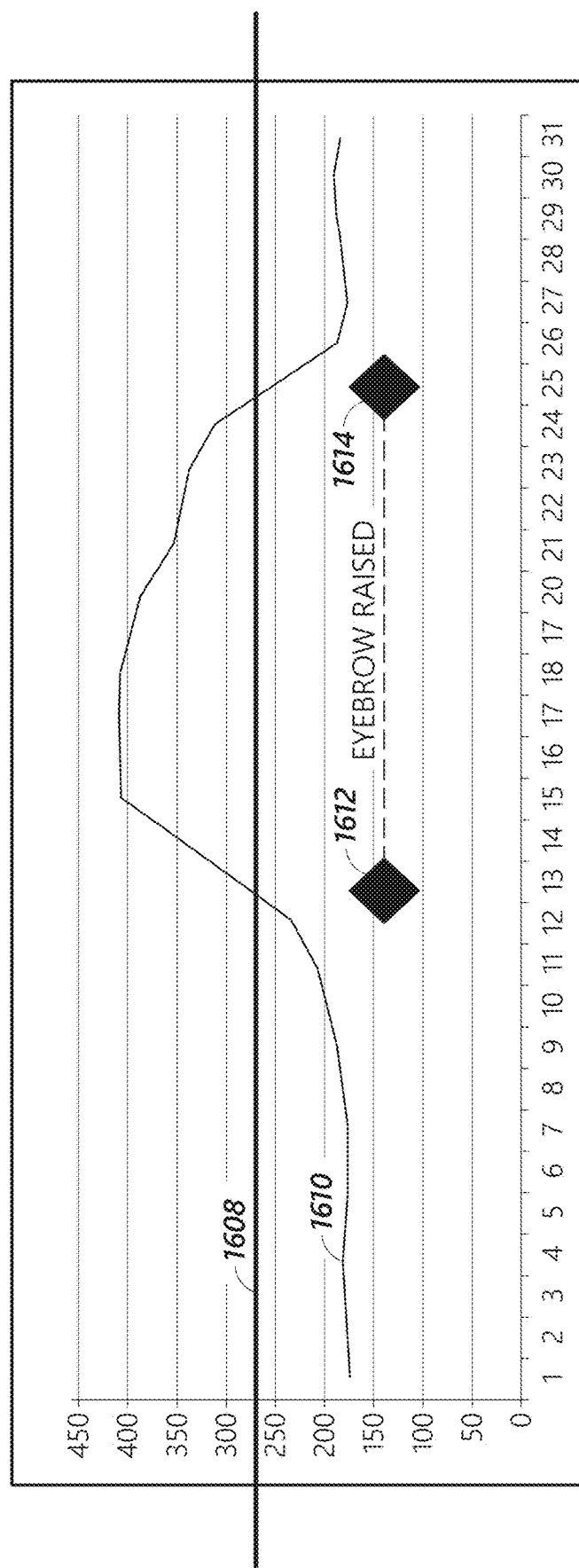

FIGS. 16A-16C illustrate example observations of upper periocular region movements in a tightly fitting device. Observations such as these can be used to determine movement of the eyebrow. A tightly fitting device is generally positioned closer to the face of the user (as illustrated in FIG. 14B) and provides for a narrower FOV (as illustrated in FIG. 12B). Generally, the whole of the tightly fitting device moves upward when eyebrows are raised, resulting in a displacement of the whole camera image obtained by the ET cameras 5060*a-b*. Conversely, the whole of the device moves downward when eyebrows are lowered. The displacement of the whole camera image is reflected in the position of eyes and pupil-glints observed from the eyes. FIG. 16A illustrates such displacement of eyes 1604 and 1606 compared to a reference line 1602. The reference line 1602 can be defined as between left and right pupil centers when the eyes are in a relaxed position, looking straight forward.

In some embodiments, the position of each of the eyes may be represented by a respective vertical eye center (VEC). FIG. 16B shows example images of pupils with pupil-glints 5190*a-d* (the right image is an inverse image that highlights the pupil-glints). Various methods may be employed to define and determine the VEC. For example, extracting the corner points of an observed eye and connecting the corner points can identify a VEC. Another method may be forming crossing lines with pupil-glint pairs 5170*a* and 5170*c*, and 5170*b* and 5170*d*, and identifying a point where the lines cross, which may be utilized as a VEC. Other methods may also be available and those methods may be used alone or in combination depending on the accuracy and precision of the results.

FIG. 16C is a graph that shows an example of a determination of VEC as a function of time. On the X-axis is a frame count (or time) and on the Y-axis is a VEC value 1610. In some embodiments, the VEC value may be calculated in coordinates of the ET camera 5060*a* (e.g., pixels). From left to right, the graph depicts the VEC rising from a neutral position, peaking, falling, and returning to the neutral position. The system can identify an eyebrow raise event as corresponding to the times during which the VEC exceeds a threshold 1608. In the example shown in FIG. 16C, the eyebrow was raised between frame (or time) 1612 and frame (or time) 1614. The threshold 1608 can be set so that minor movements or noise do not trigger the system to infer an eyebrow raise. For example, the threshold can be set to any suitable number, for example 50% of the total VEC movement (e.g., in FIG. 16C, the total VEC movement is about 200 pixels and the threshold is about 100 pixels above the neutral position (at about 175 pixels)). Some systems may prefer to err on the side of detecting potentially more false positives, and hence may choose a threshold between 0 and 50%. Other systems may prefer to err on the side of fewer false positives, and hence may choose a threshold above 50%. As described, the wearable display system 100 may perform a temporal consistency check to remove any false positive eyebrow raises. For example, an eyebrow raise may be identified only if VEC exceeds the threshold 1608 for greater than a threshold number of frames (or a threshold time period), which may advantageously reduce false positives that are due to noise or very minor facial fluctuations. The VEC movement can, in some cases, be measured during an eye blink so that interpolation or other corrective measures for eye blink may not be needed.

Figure 17:
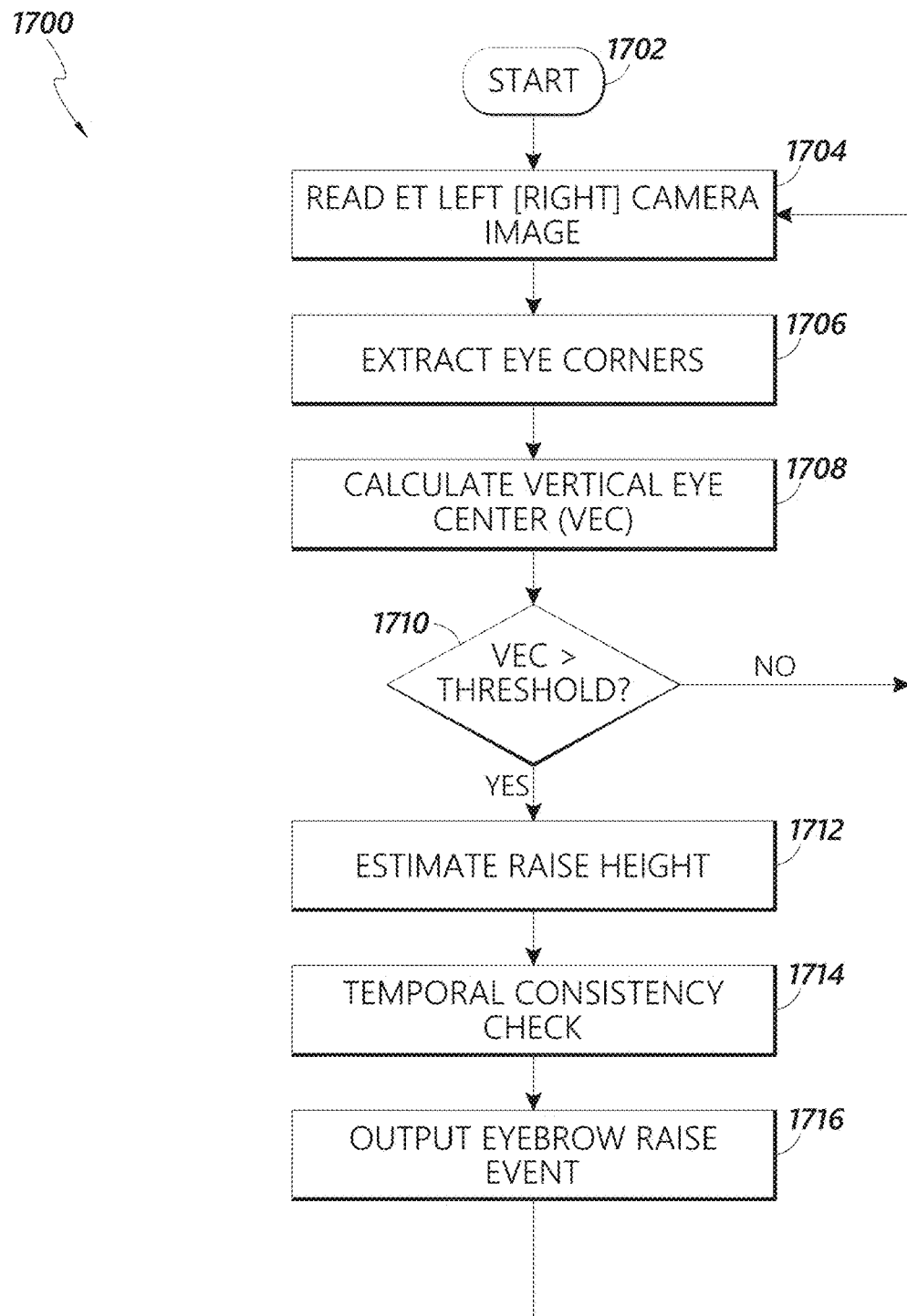
FIG. 17 is a process flow diagram of an example method for eyebrow movement detection for a tightly fitting wearable device.

FIG. 17 is a process flow diagram for an example method for detecting an upper periocular region event (e.g., an eyebrow raise event) for a tight fitting device. Block 1702 is the start of the process 1700. At block 1704, the ET camera 5060*a* obtains one or more images of a periocular region of an eye (left or right). At block 1706, the system extracts eye corners from the obtained periocular images. At block 1708, the system may initiate calculation of the VEC, for example, by connecting the extracted eye corners with a line.

At block 1710, the VEC is compared against a threshold to determine whether an eyebrow raise event is detected. The threshold may be calculated when a user puts the device on, or can be adjusted when the system detects device adjustments or removal. If the VEC is less than (or equal to) the threshold (which indicates the eyebrow has not been raised), the system may proceed back to block 1704 to read subsequent periocular images. If the VEC is greater than the threshold, the system proceeds to block 1712.

At block 1712, the system estimates the eyebrow raise height. For example, with reference to FIG. 16C, the eyebrow raise height can be the difference in VEC values between the peak of the curve 1610 and the neutral VEC position. The system can determine a duration of eyebrow raise, such as the time difference between points 1614 and 1612. In some embodiments, a maximum eyebrow raise height is measured and stored to account for individual user differences. The eyebrow raise height may be estimated in strength with a percentage value ranging from 0% to 100% above the threshold (or above the neutral position) to the maximum.

In some embodiments, the system may estimate the eyebrow raise height before the eyebrow raise height reaches an apex of the VEC value associated with the eyebrow raise event. For example, the system may determine that a change in VEC value matches, for example, the first 50% of a previous eyebrow raise profile and return an estimation of an eyebrow raise height before the entire period of the eyebrow raise event. The eyebrow raise height may be estimated before or after the VEC value returns to neutral. Thus, embodiments of the system can determine an eyebrow raise event without measuring VEC throughout the entire eyebrow raise event. Other raise height estimation methods may be employed.

At block 1714, the system may perform various additional processing to enhance consistency or fidelity of the estimated eyebrow raise event. For example, the system may interpolate through any missing values (e.g. during blink events), which may be implemented with allowance of some maximum number of missing frames, such as 3. In some embodiments, the system may conduct a temporal consistency check that expects a continuous raise until an apex point and then a continuous decline. In addition, the system may account for unreasonable outliers, such as by terminating the eyebrow event when the event exceeds a threshold time (e.g., if the eyebrow is raised for over 2 seconds, 5 seconds, etc.). Once block 1714 is completed, the block may output information related to an occurrence of eyebrow raise (e.g., a Boolean value as to whether an eyebrow raise occurred) event or strength of the raise before returning to block 1704 for another iteration of the event detection process. The process flow illustrated may run in parallel for the left and right eyes, providing for independent detection of eyebrow raise events for each eye (since eyebrows can be raised independently).

Examples of Loose Fit Upper Periocular Region Movement Detection

As described above, for loose fitting devices (which are positioned farther away from the user as shown in FIG. 14A), the device itself typically does not move during an eyebrow raise event. The techniques described with reference to FIGS. 16A-17 may not permit reliable or accurate detection of an eyebrow raise for loosely fitting devices.

FIGS. 18A and 18B schematically illustrate examples of detection of upper periocular region movements in a loosely fitting device. Generally, the distance between the skin and the device changes with muscle stretches and compressions. FIG. 18A illustrates a periocular region with a neutral eyebrow position. FIG. 18A shows examples of three patches 5190*a*-5190*c* in the inner, mid, and outer portions of the upper periocular region to provide for detection of the eyebrow raise event. In other embodiments, more or less patches may be utilized and the patches may be at other locations. For example, five patches may be used that are closer to the pupil along the upper portion of the eye corner. Additional examples of patches are described with reference to FIGS. 20A-20D.

Due to the external and fixed illumination of the eye tracking system 500 (e.g., the IR LEDs 508*a*, 508*b*), the average intensity of light reflected from an associated patch may be a good indicator for the distance from the ET camera 5060*a* to the skin. Each patch may include a pixel matrix (e.g., 5×5 pixels) and have associated values representing light intensity reflected from the patches (e.g., 0 to 255 with 0 representing black and 255 representing white). An average intensity value of the pixel matrix (e.g., an average (weighted or otherwise) of the 25 pixels for a 5×5 matrix) can be calculated by the system. The system can track the average intensity of the pixel patches over time and from movements of the patches (e.g., an optical flow), the system can determine an eyebrow raise event and which parts of the eyebrow are being raised (e.g., from the optical flows of the inner, mid, and outer patches).

FIG. 18B illustrates an example of a periocular region with a raised eyebrow position. Here, the raised eyebrow position causes the three patches to return different patch intensities as compared to the patch intensities from the eyebrow position shown in FIG. 18A.

Figure 18C:
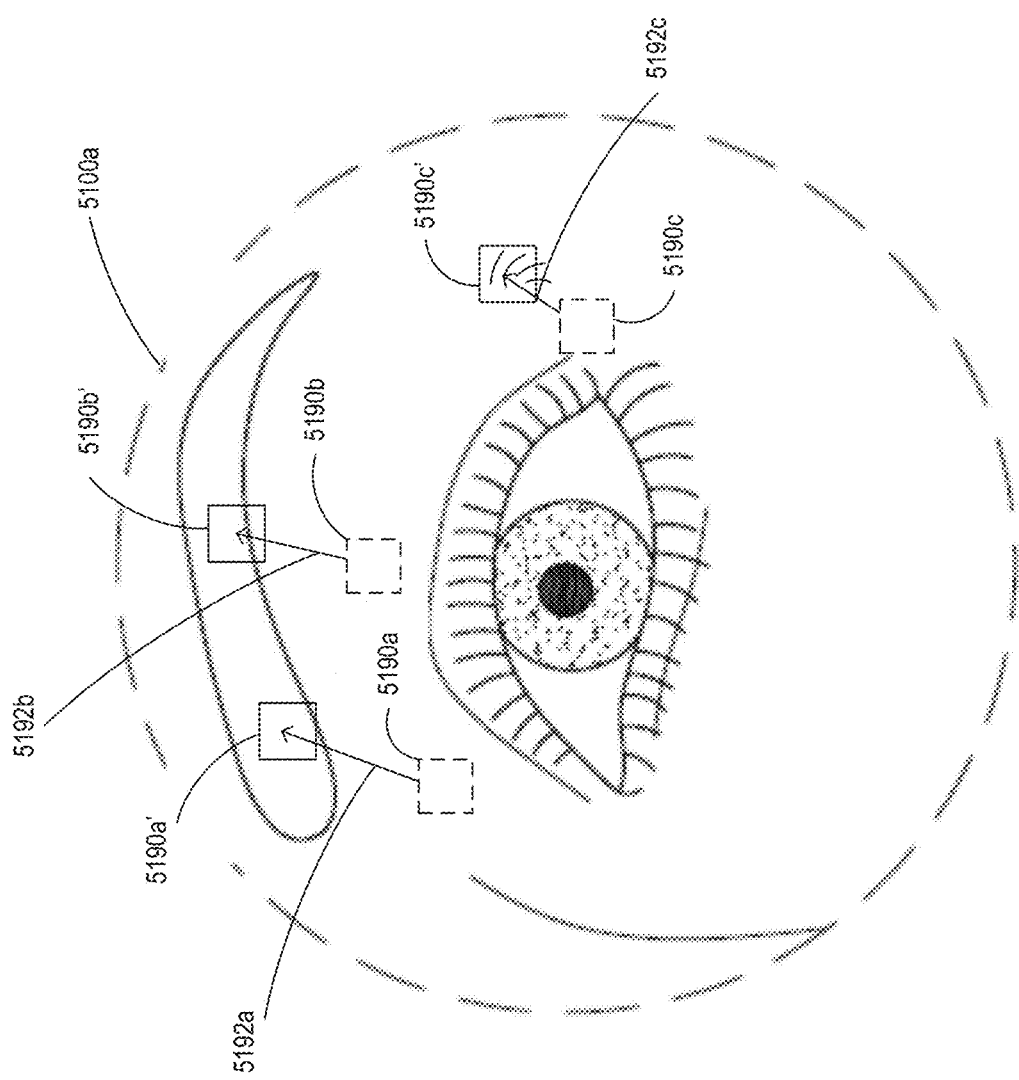
FIG. 18C illustrates examples of optical flows of features in the periocular region.

Additionally, the system may capture the upward (or downward) movement of the eyebrow as an optical flow. FIG. 18C illustrates an example of optical flows 5191*a*-5191*c* in which the patches move from a starting positions 5190*a*, 5190*b*, 5190*c* (shown in dashed lines) to ending positions 5190*a'*, 5190*b'*, 5190*c'* respectively (shown in solid lines). By measuring (e.g., with an eye tracking camera) the reflectivity of the patches during this movement, the system can determine the path (and direction) of an optical flow 5192*a*, 5192*b*, 5192*c* for each of these patches and thereby determine the occurrence or extent of the movement of the wearer's skin during an eyebrow raise or lowering event. In various embodiments, the system may determine the full path of the optical flow or a series of points along the flow path (e.g., possibly only the starting and ending positions). The system may determine a speed or velocity (speed and direction) of the optical flow along any of the paths 5192*a*-5192*c*.

Although FIG. 18C illustrates an example of optical flows in the upper periocular region, this is not a limitation. An optical flow may be detected for any part of the observed periocular region 5100*a* including the lower periocular region. FIG. 18C illustrates optical flows associated with three patches, however, the underlying facial feature for the detection of optical flow can also be a muscle feature or a facial feature (e.g., wrinkles shown in patch 5190*c'*). In some embodiments, optical flow may also be detected for movement of non-visible features, such movement associated with heat as detected with infrared sensors. Additionally, optical flows can be detected for a loosely fitting or a tightly fitting device.

In some embodiments, other features of the periocular region may provide additional cues for the event detection. For example, the system may use object recognizers to extract positions or optical flows of wrinkles, blemishes, etc. around the eye corners (e.g., via Gabor filtering) and analyze whether the changes in the wrinkle, blemish, etc. positions indicate an event occurrence.

Figure 19:
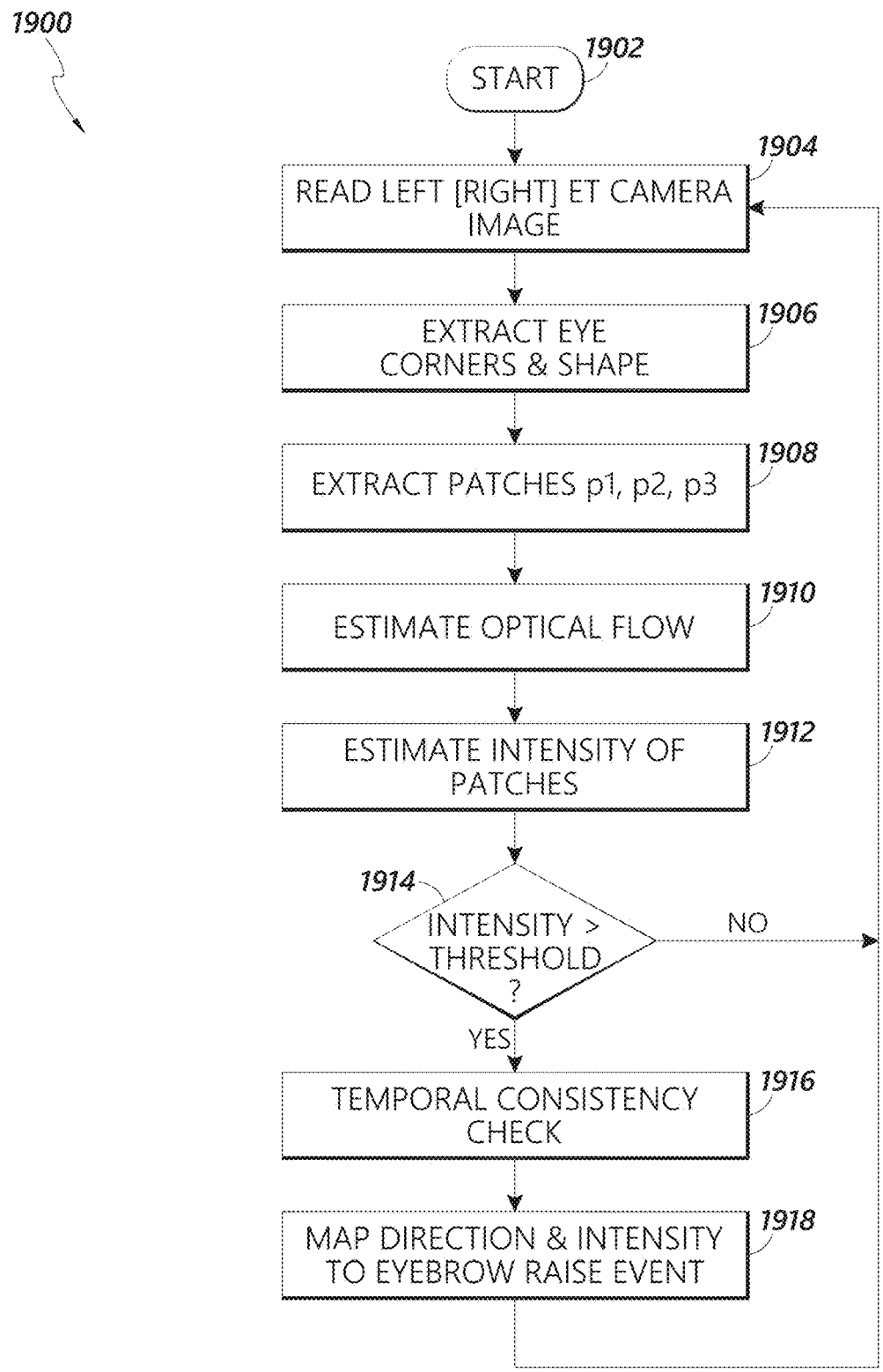
FIG. 19 is a process flow diagram of an example method for eyebrow movement detection for a loosely fitting wearable device.

FIG. 19 is a process flow diagram of an example of a process 1900 for detecting upper periocular region events. Block 1902 is the start of the process 1900. At block 1904, the ET camera 5060a obtains one or more images of a periocular region of an eye (left or right). At block 1906, the system extracts eye corners and/or eye shape from the obtained periocular images.

At block 1908, the system extracts information on the patches 5190a-5190c from the images as described with reference to FIGS. 18A-18C. At block 1910, the system estimates optical flow of the upper periocular region from the movements of the patches (see, e.g., FIG. 18C). At block 1912, the system estimates photometric intensities of the patches. As described, the intensity may be an average intensity of the pixels in the patches. Where there is restricted illumination, such as the illumination HMD provides with its inward-facing IR LEDs 508a, 508b while worn, the intensity may be a good measure of distance from the ET camera 5060a to the skin.

At block 1914, the system may compare the estimated intensity of a patch to a threshold intensity. The comparison to the threshold intensity and estimation of intensity value is further described in relation to FIG. 21A-21D. If the intensity is less than (or equal to) the threshold intensity, the patch has not been detected for some reason, and the system returns to block 1904 to read subsequent images. At block 1916, if the intensity is greater than the threshold intensity, then the system may perform additional procedures before proceeding to block 1918. Such procedures may include interpolating missing values to account for blink events (e.g., allowing for a maximum of up to 3 frames for the blink, where data may be missing or not acquired) or conducting a temporal consistency check for continuous brow movements. For example, for a consistent upward motion of the brow, the system can check whether there is a substantially continuous movement of the patch in one direction until an apex is reached followed by a substantially continuous movement back to the neutral position.

If the temporal consistency of the movement is confirmed at block 1916, at block 1918, the system maps a direction of the optical flow (e.g., upward or downward) and determines an occurrence or strength of the eyebrow raise event. For example, the strength of the eyebrow raise may reflect how far a portion of the eyebrow moved. As described with reference to FIG. 17 the eyebrow raise height may be estimated in strength with percentage value ranging from 0% to 100% above the threshold (or above the neutral position) to the maximum. The system may utilize a plurality of patches (e.g., 3 or more) disposed across the length of the eyebrow (e.g., as shown in FIGS. 18A-18C) to determine with granularity the amount or strength of eyebrow raise for multiple portions of the eye, e.g., for inner, mid, and outer brow portions.

The mapping generated at block 1918 may include a probabilistic estimate for corresponding face parameters of the lower face. The lower face may include the regions below the periocular region(s) that are shown in the periocular images. The lower face may include the nose, lips, cheeks, and jaw regions. For example, the wearable device may select the most likely face parameters based on the temporal consistency check (block 1916) or from input from other sensors such as audio input, physiological data (such as pupil dilation state, heart rate, etc.), EOG data, and so on, alone or in combination. For example, audio input from a microphone may indicate the user is laughing, and the audio input can be combined with the estimates from the periocular imaging to provide a more likely lower face representation.

In some embodiments, other features of the periocular region may provide additional cues for the event detection. For example, the system may use object recognizers to extract positions or optical flows of wrinkles, blemishes, etc. around the eye corners (e.g., via Gabor filtering) and analyze whether the changes in the wrinkle, blemish, etc. positions indicate an event occurrence.

The system may output or store an event matrix describing properties of the eyebrow raise event. For example, the event matrix can comprise an n×3 matrix (where n is the number of patches) with the first column identifying the patch number (from 1 to n), the second column including an occurrence indicator for the patch (e.g., a Boolean such as 0 or N(o) for no raise and 1 or Y(es) for a raise), and a third column including the strength of the raise for that patch.

Examples of Lower Face Event Detection

As described above, the distance of the skin to the HMD changes with muscle contraction. Muscle flow directions provide significant cues for detecting expressions of the face.

FIG. 20A-20D illustrate example periocular images showing muscle contraction of a right eye before (FIGS. 20A, 20B) and while smiling (FIGS. 20C, 20D). FIGS. 20A and 20C show eye camera images, and FIGS. 20B and 20D show thresholded eye camera images. The images show patches 2302a, 2302b near the lower portion of the eye. The patches are located asymmetrically along the arc of the eye. Photometric comparison of the images before (FIGS. 20A, 20B) to those while smiling (FIGS. 20C, 20D) show the changes in the patch reflectivities, which are particularly apparent in the difference between the threshold images (FIGS. 20B, 20D).

In some embodiments, the photoreflective sensors (illustrated in FIG. 11, 67a, 67b) may supplement or replace the intensity measurement by the eye tracking cameras 5060a, 5060b. The photoreflective sensors are generally inexpensive and good at detecting light intensity for determination of proximity. The photoreflective sensors may provide additional cross checking of the eye tracking camera's patch-based intensity detection or replace the patch-based intensity detection altogether.

Figure 21:
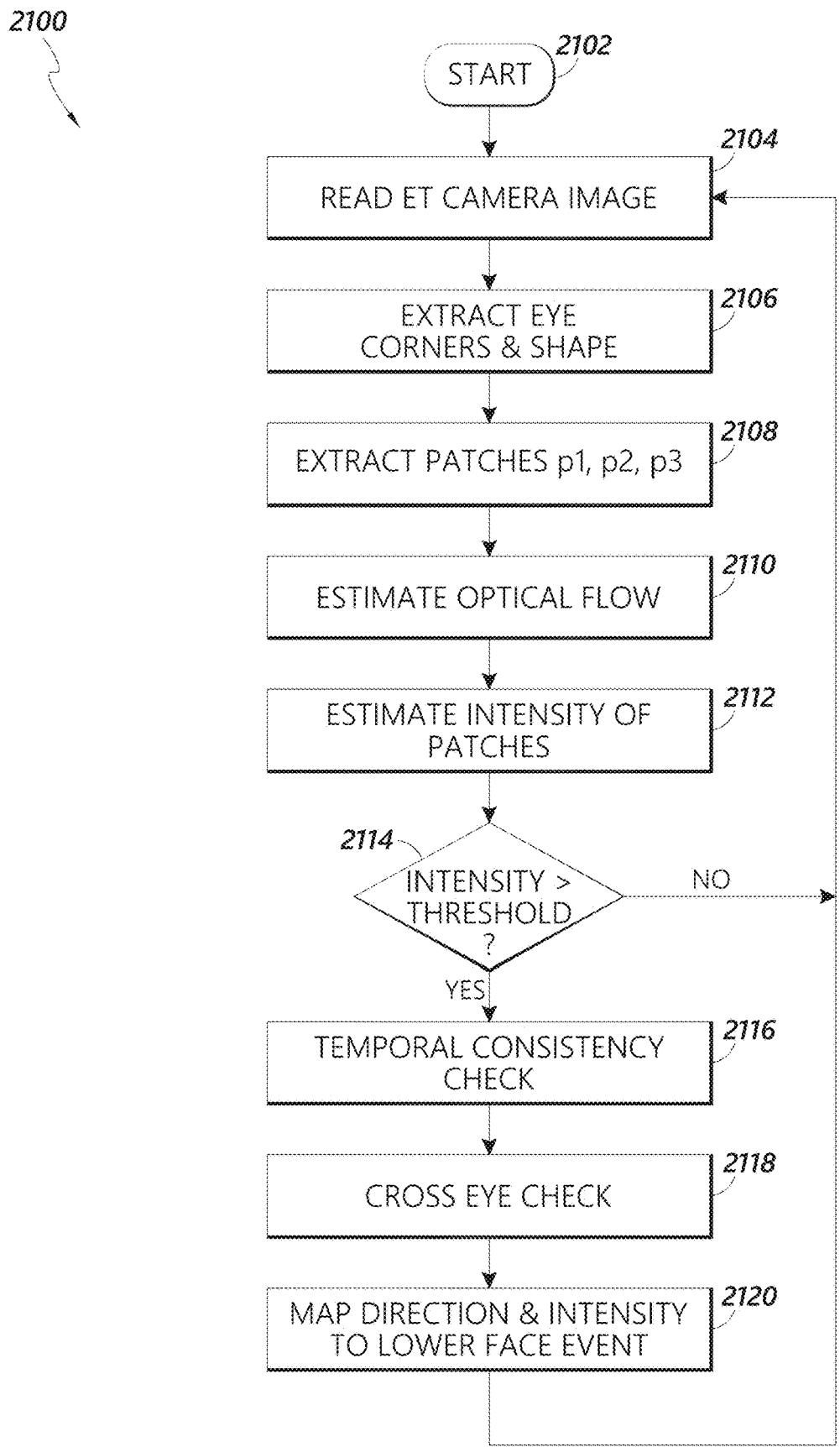
FIG. 21 is a process flow diagram of an example method for inferring lower face events from changes in periocular images.

FIG. 21 is a process flow diagram of an example method 2100 for inferring lower face events with changes in periocular images. Blocks 2102-2116 are generally similar to corresponding blocks 1902-1916 of the method 1900 described with reference to FIG. 19 and will not be further described herein.

At block 2118, the system performs a cross eye check. Generally, for lower face conformation, outputs generated from the analysis of periocular regions of each eye are expected to be consistent with each other. For example, a smile is generally detected from both left and right eyes reporting lifting of the periocular regions and not just one eye lifting its associated periocular region. When each periocular region analysis reports a different lower face conformation, various methods may be employed to resolve the difference. For example, when the difference is small, the results for the left and right eyes may be averaged to provide an average lower face conformation. Additionally or alternatively, the system may assign a higher priority to the stronger readings (based on intensity of the patches or some other metrics). In some instances, the system may reject both determinations and return to block 2104 to read additional eye images.

At block 2120, the system maps direction of optical flow and intensity of the patches to a lower face event by leveraging a mapping table or a model of facial conformation. Examples of training a personalized model are described with reference to FIG. 23. The model may also comprise a pre-trained model based on machine learning applied to a wide range of facial conformations from a population of individuals. In some cases, the mapping table is based on FACS AUs that taxonomizes facial movements. In some implementations, the system may use a mapping from a facial expression (e.g., group of FACS AUs) to a corresponding emotion (e.g., happy, sad, etc.). The system may thus determine an emotion the wearer may be experiencing based on analysis of periocular images.

The lower face conformation provided by block 2120 may be checked with user data collected with other sensors to reduce false positives. For example, as described above, the system may extract wrinkles (or other facial features) around the eye corners via Gabor filtering and check whether the wrinkles (or other facial features) have displayed changes in conformance with the intensity changes. The system may analyze some past duration of audio observations (such as last 30 seconds) obtained from one or more microphones 69 to determine a baseline mood of the wearer and use this audio data to modify or update the mapping result. For example, when audio data informs of a jovial mood, the system may adjust the resulting facial expressions to reflect the jovial mood. Alternatively, when an audio data informs of a lot of shouting, the system may adjust the resulting facial expressions to reflect tense facial features. Further, the system may utilize phoneme to viseme analysis to provide additional information about the likely conformation of the lower face (e.g., as described in U.S. patent application Ser. No. 15/717,223, filed Sep. 27, 2017, titled Face Model Capture by a Wearable Device, which is hereby incorporated by reference herein in its entirety or U.S. patent application Ser. No. 15/808,516, filed Nov. 9, 2017, titled Periocular and Audio Synthesis of a Full Face Model, which is hereby incorporated by reference herein in its entirety). For example, the results from block 2120 can be combined (e.g., averaged) with the results of a phoneme-viseme analysis to determine a more realistic representation of the user's lower face. Additionally, smart weighting, such as giving more weight to other sensors when no audio data is present, may be employed.

Examples of Personalization and Fidelity Increase of Facial Feature Correlation

Figure 22:
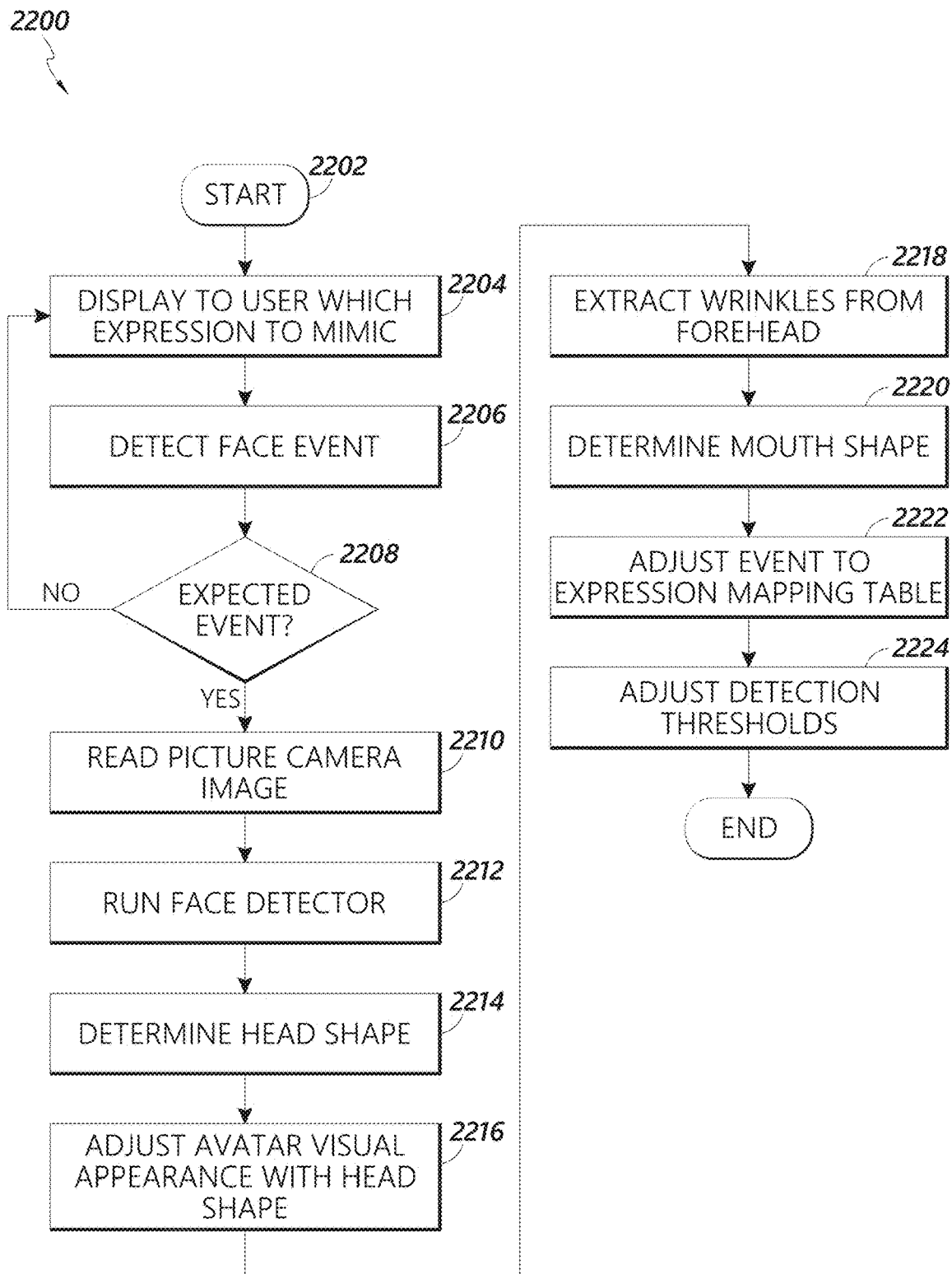
FIG. 22 is a process flow diagram of an example method for personalization of a wearable device for better correlation between user facial features and avatar facial features.

FIG. 22 is a process flow diagram of an example method 2200 for personalization of the wearable device. The personalization method 2200 is structured to take an individual user's differences into account and make defined adjustments specific to the user such that the device may provide better correlation between the user's facial periocular facial features and inferred lower face movements. This personalization method 2200 can provide more realistic avatar facial features for the user. For example, the method may allow the system to make a personalized adjustment between actual detected visible facial events to approximations of the facial events provided by the mappings described with reference to blocks 1918 and 2120 in FIGS. 19 and 21. In some embodiments, the personalized adjustments may include adjustments of weights for the mapping of extracted features, such as patch intensity, optical flow, etc.

At block 2202, the process 2200 starts and a user wears the device and stands in front of a mirror such that the mirror reflects the user's image back to the device. The outward facing camera 502 should be positioned such that at least some portions of the user's unobstructed mouth and forehead are captured from the mirror image (the user's eye area is occluded by the device). As will be further described, during the method, the user will be asked to perform a series of facial poses or express a series of emotions, the outward facing camera will capture these poses, and the method will analyze the images and generate personalized mappings and parameters that can be used in the methods 1900 and 2100.

At block 2204, the device instructs via cues, including visible (e.g., by the display 62) or audio (by a speaker 66) cues, which expression to mimic. The proposed expression may consist of words or images, or a combination of both. At block 2206, the system performs face detection on the image(s) detected by the camera and object recognizers can determine whether the user is performing the requested expression. For example, the system can compare facial features associated with the requested expression and the corresponding features of the user's actual expression to determine whether they match. At block 2208, if the expression detection algorithm detects a mismatch, the system returns to block 2204 and instructs the user to mimic a same or a different expression. Alternatively, if the algorithm detects a match, the system proceeds to block 2210.

At block 2210, the system reads image(s) from the outward facing camera 502. The image is a mirror image of the user and some embodiments may horizontally transpose the image to obtain a true image of the user. At block 2212, the system runs a face detecting algorithm to extract key features for head shape, mouth shape, or any other facial features that are not occluded by the HMD (e.g., some eye or nose features may be occluded by some versions of the HMD). At block 2214, using the extracted features from block 2212, the system determines the head shape of the user. At block 2316, using the determined head shape, the system adjusts the visual appearance of an avatar to reflect the user's measured head shape. For example, the system can compare the determined head shape with head shapes in an avatar database and select the closest matching head shape (or interpolate among nearby head shapes).

At block 2218, the system extracts other facial features such as wrinkles or freckles from regions of the face that are not occluded (e.g. the forehead region) of the image. The wrinkles or freckles of the images are compared against a neutral image of the user and a dynamic image of the user (e.g., mimicking a requested non-neutral expression) to determine which of the features are inherent to the user's neutral face (e.g., caused by aging) and which are due to facial movements caused by performance of the facial expression.

At block 2220, using the extracted features from other blocks (e.g., block 2212), the system determines the lower face conformation (e.g., mouth shape) from the images and the lower face conformation from the methods described with reference to FIGS. 15, 17, 19, and 21. At block 2222, the system calculates personal adjustments specific to the user to account for any discrepancies between the actual, detected lower face conformation (from the mirror images) and estimates of the lower face conformation using the techniques described herein (e.g., the output of the method 2100). The system can re-adjust weights specific to the user to better account for the mapping of extracted features (such as patch intensity, optical flow, etc.) to actual detected visible events.

At block 2224, the system adjusts detection thresholds for the user based on the minima and maxima (e.g., minimum and maximum intensity changes, eye positions, or eyebrow raise heights) obtained from the collected frames of mimicked expressions. In some embodiments, the wearable device may obtain and analyze a user's image regularly or according to a schedule to further calibrate the device for the user (e.g., by displaying a request to the user to initiate the calibration beginning at block 2204). The regular or scheduled calibrations may occur while the user is interacting with the device without the user noticing possible interruptions due to calibrations (e.g., a calibration agent may run in the background). Such continued online calibrations to the user's calibration profile can ensure best sensitivity for the user over time.

In some embodiments, the process may be repeated multiple times to obtain higher accuracy and/or precision. Further, if the user changes his or her facial appearance (e.g., if a user were to grow a beard), the method 2200 can be repeated to re-do the personalizations.

Examples of Inferring Facial Expressions with an Image of the Periocular Region

Figure 23:
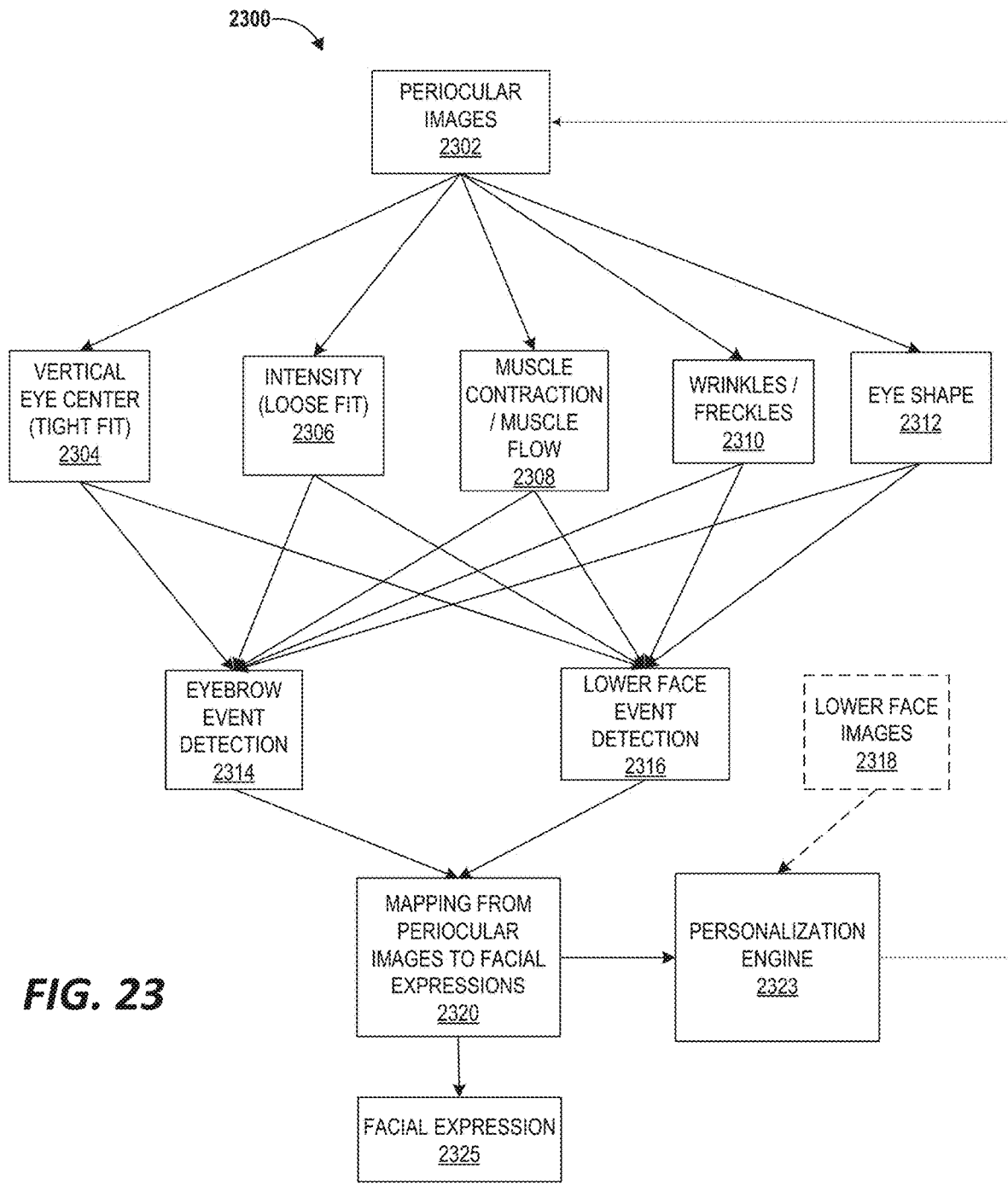
FIG. 23 is a block diagram of a system for determining a facial model of a user from periocular images of the user.

FIG. 23 is a block diagram that illustrates an example of a facial expression determination system 2300. The facial expression determination system 2300 may be implemented by the wearable devices described herein, e.g., the wearable system 100, 5050. For example, processing may be performed by the local processing & data module 71 or the remote processing module 72 using data stored in the local or remote data repository 74 (shown in FIG. 2). Periocular images can be taken by the inward-facing imaging system 500.

As described herein, the system 2300 uses periocular images 2302 obtained by an eye tracking camera to generate a representation of regions of the face unimaged by the eye tracking camera, e.g., the lower face (e.g., mouth, lips, etc.) A mapping of periocular features to facial expressions 2320 of the lower face or the entire face can be generated. The mapping 2320 can be generated by synthesizing eyebrow events 2314 and lower face events 2316. The eyebrow events and lower face events may be determined by the system 2300 based on whether the fit of the wearable device is tight or loose on the face of the wearer. For a tight fit, VEC changes 2304 can be analyzed (e.g., FIG. 17), and for a loose fit, intensity changes 2306 can be used (e.g., FIG. 19). The system 2300 can utilize measured muscle contractions or muscle flows 2308, optical flows of wrinkles or freckles 2310, or changes in eye shape 2312 obtained from the periocular images 2302, alone or in combination. The various features of the periocular region may also be described (or encoded) by periocular region parameters (e.g., face space parameters in a deformable linear model (DLM), FACS action units, etc.). The eyebrow event detection 2314 and lower face event detection 2316 (see, e.g., FIG. 21) can be combined to generate a mapping from the periocular images to a facial expression (e.g., of the lower face or the entire face). The mapping 2320 can be used to determine a facial expression for the lower portion of the face, in the regions unimaged by the eye tracking cameras that obtain the periocular images 2302.

Various machine learning algorithms may be used by the system 2300, for example, to generate the mapping 2320 or the facial expression 2325. Some examples of machine learning algorithms that can be used to generate and update the models can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate a base model. The base model may be used as a starting point to generate additional models specific to a data type (e.g., a particular user), a data set (e.g., a set of additional images obtained), conditional situations (e.g., fit during gameplay may be different than fit during Internet browsing), or other variations. In some embodiments, the wearable device can be configured to utilize a plurality of techniques to generate models for analysis of the aggregated data. Other techniques may include using pre-defined thresholds or data values. Over time, the wearable device can continue to update the machine learning derived mapping 2320.

The system 2300 can include a personalization engine 2323 configured to implement personalization of the facial mapping as described with reference to FIG. 22. As described, an outward-facing imaging system can acquire images of the user's lower face 2318 (e.g., while the user is positioned in front of a mirror) and use these images to tune the system to better reflect the user's personality and increase fidelity of emotional expressiveness. Personalization can be performed when the HMD is acquired or periodically during use of the HMD by the user.

Figure 24:
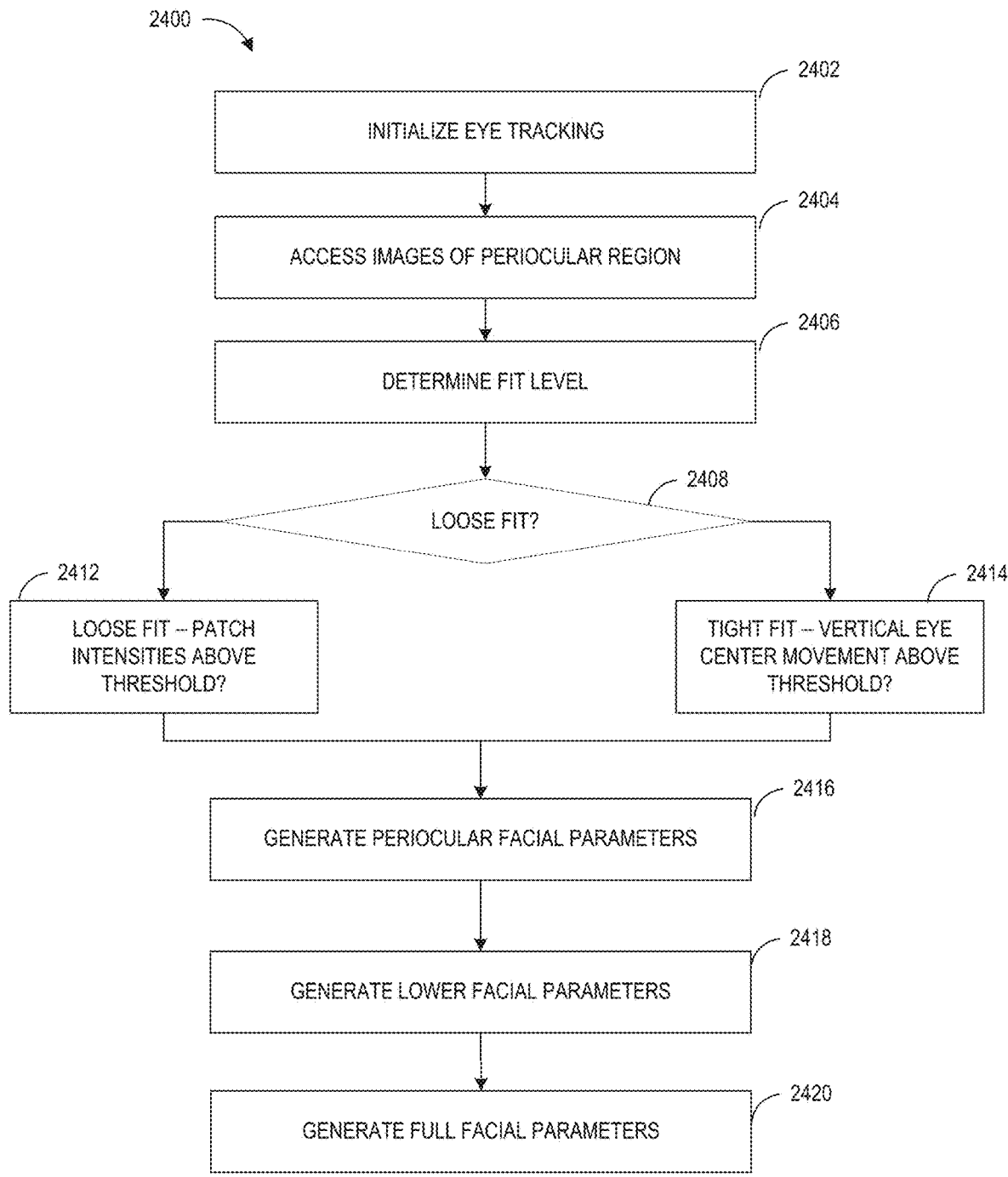
FIG. 24 illustrates an example process of synthesizing a full face model from periocular images of a user and animating an avatar based on the full face model or communicating the full face model to another user.

Examples of Synthesizing a Full Face Image and Animating an Avatar with the Full Face Image FIG. 24 is a flowchart for an example method 2400 for generating full face parameters from images of the periocular region of the face. The method 2400 can be performed by the wearable devices 100, 5050. At block 2402, the method initializes eye tracking of the periocular region of an eye of the wearer of the device. In some methods, both of the wearer's eyes are tracked. At block 2404, the method accesses images of the periocular region. At block 2406, the fit level of the device on the face of the wearer is determined. For example, the fit level may comprise a loose fit or a tight fit described, for example, with reference to FIGS. 14A and 14B, respectively.

At decision block 2408, the method determines whether the fit is loose, and if so, moves to block 2412, where the method 1900 described with reference to FIG. 19 can be utilized to measure periocular features based on levels of reflected light intensity (typically in the IR). If the fit is determined not to be loose, the method moves to block 2414 where the method 1700 described with reference to FIG. 17 can be utilized to measure movement (e.g., upward or downward) of the device on the face of the user. As described, such movement of the device can be used to infer movements of the eyebrow.

At block 2416, the periocular measurements taken at block 2412 or block 2414 are used to generate periocular facial parameters that represent the movement of the wearer's periocular region while the wearer is performing an expression. For example, the periocular facial parameters can represent eyebrow movement (e.g., raising or lowering), movement of the corners of the eyes, movement of the skin or eyelids around the eyes, and so forth. Face parameters (for the periocular, lower, or whole face) can include FACS action units (AUs), deformable linear model (DLM) parameters, active shape model (ASM) parameters, active appearance model (AAM) parameters, morphable model (M) parameters, or parameters for any other two-dimensional (2D) or 3D shape or texture model, alone or in combination.

At block 2418, the method generates lower facial parameters that correspond to lower regions of the face that are not imaged by the eye tracking cameras. The lower facial parameters can comprise DLM parameters, FACS action units, etc. At block 2420, the periocular facial parameters and the lower facial parameters are combined to generate facial parameters for the full face of the wearer. The full facial parameters may comprise DLM parameters, FACS action units, or a full 3D facial model (e.g., lower face and periocular regions). The full facial parameters can be used by the device to animate an avatar representing the wearer, so that the avatar performs the full facial expression in the virtual world that is being performed by the wearer in the real world. In a telepresence environment, the full facial parameters may be communicated to a second user's wearable device, which uses the facial parameters to display to the second user an animation of the first user during the telepresence session (see, e.g., FIG. 10B). The method 2400 can be performed in real-time so that the avatar rendering occurs in real time with reduced or minimal latency.

Figure 25:
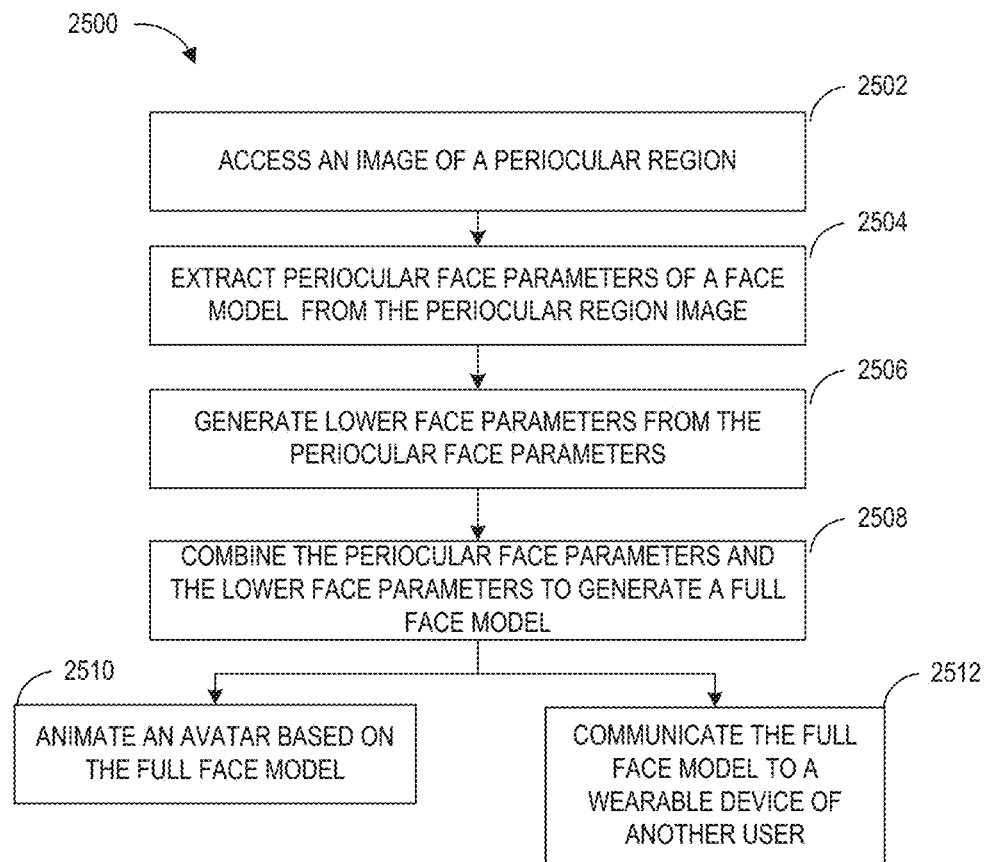
FIG. 25 illustrates another example process of synthesizing a full face model from periocular images of a user and animating an avatar based on the full face model or communicating the full face model to another user.

FIG. 25 is a flowchart for another method 2500 of generating a facial model of a wearer of an HMD from images of the periocular region of the wearer. The method 2500 can be performed by the wearable systems 100, 5050. At block 2502, the method accesses an image of a periocular region of the wearer of the HMD. In some cases, the eye-tracking camera of the HMD is used to capture the periocular images. In some implementations, the periocular images are analyzed to determine a level of fit of the HMD on the face of the wearer (e.g., as described with reference to FIGS. 14A, 14B, and 24). At block 2504, the periocular images are analyzed and periocular face parameters are extracted from the images. At block 2506, lower face parameters that correspond to the expression represented by the periocular face parameters (block 2504) are generated. The periocular and lower face parameters can be combined at block 2508 to generate a full face model (e.g., a DLM model, FACS AUs, etc.).

At block 2510, the full face model can be used by the HMD to animate the appearance of an avatar based on the facial expression the wearer of the HMD is performing in the real world. Additionally or alternatively, at block 2512, the wearer's HMD can communicate the full face parameters to the HMD of another user, for example during a telepresence session, and the other user's HMD can render an avatar representing the wearer.

Additional Aspects

1. A wearable system comprising: an inward-facing imaging system configured to image a periocular region of a wearer of the wearable system; a hardware processor programmed to: acquire a periocular image, via the inward-facing imaging system, of the periocular region of the wearer; generate, based at least partly on the periocular image, periocular face parameters encoding a periocular conformation of at least the periocular region of the wearer; generate, based at least partly on the periocular face parameters, lower face parameters of the lower face of the wearer, wherein the lower face is unobserved by the inward-facing imaging system when worn by the wearer; combine the periocular face parameters and the lower face parameters to generate full face parameters associated with a three-dimensional (3D) face model of the wearer; and store the full face parameters for use by a rendering engine to generate a 3D animation of the face of the wearer.

2. The wearable system of aspect 1, wherein the 3D face model comprises a deformable linear model and wherein the periocular face parameters and the lower face parameters describe a deformation of the face of the wearer.

3. The wearable system of aspect 1 or aspect 2, wherein periocular face parameters or the lower face parameters comprise action units of a facial action coding system.

4. The wearable system of any one of aspects 1-3, wherein the 3D face model is generated without use of audio data representative of sounds made by the wearer.

5. The wearable system of any one of aspects 1-4, wherein the inward-facing imaging system comprises an eye-tracking camera and an infrared (IR) light source.

6. The wearable system of any one of aspects 1-5, wherein to generate the periocular face parameters the hardware processor is programmed to: analyze intensities of light reflected from patches of the periocular region; or analyze an optical flow of patches of the periocular region; or determine upward or downward movement of the wearable system relative to an eye position of the wearer.

7. The wearable system of any one of aspects 1-6, wherein the hardware processor is further programmed to: determine a fit level of the wearable system on the wearer, wherein the fit level comprises a loose fit or a tight fit; in response to a determination of a loose fit, generate the periocular face parameters based at least partly on intensity measurements or optical flow of patches in the periocular region; or in response to a determination of a tight fit, generate the periocular face parameters based at least partly on movement of the wearable system relative to the face of the wearer, the movement responsive to a facial expression of the wearer.

8. The wearable system of aspect 7, wherein to generate the periocular face parameters based at least partly on movement of the wearable system relative to the face of the wearer, the hardware processor is programmed to calculate, from images obtained by the inward-facing imaging system, a time sequence for a position of an eye.

9. The wearable system of aspect 8, wherein the hardware processor is programmed to identify an eyebrow movement event based on the position of the eye passing a threshold position during the time sequence.

10. The wearable system of any one of aspects 1-9, wherein to generate the periocular face parameters based at least partly on intensity measurements or optical flow of patches in the periocular region, the hardware processor is programmed to analyze intensity or optical flow of a plurality of three or more patches.

11. The wearable system of aspect 10, wherein the plurality of three or more patches are disposed at an inner, a middle, and an outer portion near an eyebrow of the wearer.

12. The wearable system of any one of aspects 1-11, further comprising an electrooculography (EOG) sensor configured to measure muscle movements near an eye, and wherein the hardware processor is further programmed to generate the periocular face parameters based at least partly on the EOG measurements.

13. The wearable system of any one of aspects 1-12, wherein the hardware processor is programmed to perform a temporal consistency check on the periocular face parameters.

14. The wearable system of aspect 13, wherein to perform the temporal consistency check, the hardware processor is programmed to determine whether a time history of periocular features extracted from periocular images is consistent with a facial expression of the wearer.

15. The wearable system of any one of aspects 1-14, wherein: the lower face parameters comprise first lower face parameters generated from analysis of a left periocular region and second lower face parameters generated from analysis of a right periocular region, and the hardware processor is programmed to perform a cross eye check for consistency between the first lower face parameters and the second lower face parameters.

16. The wearable system of any one of aspects 1-15, wherein the hardware processor is further programmed to determine personalized parameters associated with actual facial expressions of the wearer.

17. The wearable system of aspect 16, wherein the hardware processor is programmed to: communicate an instruction to the wearer to perform a first facial expression; capture an image of the wearer performing the first facial expression; analyze the image to determine or update one or more of: a visual appearance of a face of an avatar corresponding to the wearer; a head shape of the avatar; facial features of the wearer performing a neutral expression; detection thresholds used by the wearable system to generate the periocular face parameters, the lower face parameters, or the 3D model; or a mapping table of facial conformations.

18. The wearable system of any one of aspects 1-17, wherein the hardware processor is programmed to communicate the full face model or the 3D face model to a second wearable system via a wireless network.

19. A method comprising: under control of a head-mounted display (HMD) comprising a hardware processor in communication with non-transitory memory and an inward-facing imaging system configured to image a periocular region of a user: accessing a periocular image acquired by the inward-facing imaging system; determining, based at least partly on the image, periocular face parameters for a periocular conformation of at least the periocular region of the user; calculating, based at least partly on the periocular face parameters, lower face parameters for a lower region of the face of the user, the lower region not imaged by the inward-facing imaging system; and combining the periocular face parameters and the lower face parameters to generate full face parameters for the face of the user.

20. The method of aspect 19, further comprising: determining a level of fit of the HMD on the face of the user, the level of fit comprising a loose fit and a tight fit; in response to determining the level of fit is a loose fit: analyzing an intensity of light reflected from a patch of skin in the periocular region of the user; and determining an eyebrow movement of the user from the analysis of the intensity of light; or in response to determining the level of fit is a tight fit: analyzing periocular images to determine movement of the HMD relative to an eye position of the user; determining an eyebrow movement of the user from the analysis of the periocular images.

21. The method of aspect 19 or aspect 20, further comprising performing a temporal consistency check on the periocular face parameters.

22. The method of any one of aspects 19-21, the lower face parameters comprise first lower face parameters generated from analysis of a left periocular region and second lower face parameters generated from analysis of a right periocular region, the method further comprising conducting a cross eye check for consistency between the first lower face parameters and the second lower face parameters.

23. The method of any one of aspects 19-22, further comprising: accessing images of the user performing a series of facial expressions; analyzing the images to determine user-specific facial features; utilizing the user-specific facial features in determining the periocular face parameters, the lower face parameters, or the full face parameters.

24. The method of aspect 23, wherein accessing images of the user performing a series of facial expressions comprises: acquiring the images with an outward-facing imaging system of the HMD while the user performs the series of facial expressions in front of a mirror.

25. A wearable display system comprising: an inward-facing imaging system configured to capture an image of a periocular region of a wearer of the wearable display; non-transitory memory configured to store the image of the periocular region; and a hardware processor in communication with the non-transitory memory, the hardware processor programmed to: access the image of the periocular region of the wearer; generate, based at least partly on the image, periocular region parameters encoding periocular features of the wearer; generate lower face parameters based at least partly on the periocular region parameters; and generate a representation of the full face of the wearer based at least partly on the lower face parameters and the periocular region parameters.

26. The system of aspect 25, wherein the periocular features include extensions and compressions of periocular muscles, wrinkles, blemishes, or patches in the periocular region, eyelids, or eyebrows.

27. The system of aspect 25 or aspect 26, wherein the periocular region parameters include optical flow of a periocular feature or measurement of a raise or a lowering of an eyebrow.

28. The system of aspect 27, wherein the periocular region parameters include a vertical eye center (VEC) position.

29. The system of any one of aspects 25-28, wherein the inward-facing imaging system comprises an infrared light emitting diode (IR LED) or a photo-reflective sensor configured to detect a light intensity of the periocular region.

30. The system of any one of aspects 25-29, wherein the hardware processor is programmed to: measure a light intensity of a patch in the periocular region; and compare the light intensity of the patch against a threshold to determine the distance of the periocular region underlying the patch from the inward-facing imaging system.

31. The system of any one of aspects 25-30, wherein a lower face conformation is cross-checked for full face consistency based on an eyebrow position.

32. The system of any one of aspects 25-31, further comprising an audio sensor, wherein a lower face conformation is checked for consistency against phonemes recorded from the audio sensor.

33. The system of any one of aspects 25-32, wherein a fit level of the HMD on the wearer is determined based on eye positions.

34. The system of aspect 33, wherein the eye positions are determined from pupil-glint tracking.

35. The system of any one of aspects 25-34, further comprising an electrooculography (EOG) sensor, wherein the system is configured to determine eye positions from readings of EOG sensor.

36. The system of any one of aspects 25-35, wherein the system is configured to obtain calibration data specific to the wearer, 37. The system of aspect 36, wherein the system is configured to obtain an image of a region of the wearer's face that is not imaged by the inward-facing imaging system, and wherein the calibration data comprises a head shape or a mouth shape.

38. The system of any one of aspects 25-37, wherein the system is configured to temporally check the representation of the full face against past full face parameters generated from previously captured periocular region images.

39. A method comprising: under control of a head-mounted display (HMD) comprising an inward-facing imaging system configured to image a periocular region of a wearer of the HMD and a hardware processor: acquiring a periocular image, via the inward-facing imaging system, of the periocular region of the wearer; generating, based at least partly on the periocular image, periocular face parameters encoding a periocular conformation of at least the periocular region of the wearer; generating, based at least partly on the periocular face parameters, lower face parameters of the lower face of the wearer, wherein the lower face is unobserved by the inward-facing imaging system when worn by the wearer; combining the periocular face parameters and the lower face parameters to generate full face parameters associated with a three-dimensional (3D) face model of the wearer; and storing the full face parameters for use by a rendering engine to generate a 3D animation of the face of the wearer.

40. A wearable display system comprising: an inward-facing imaging system configured to image a periocular region of a user; non-transitory memory configured to store images of the periocular region of the user; a hardware processor in communication with non-transitory memory, the hardware processor programmed to: access a periocular image acquired by the inward-facing imaging system; determine, based at least partly on the image, periocular face parameters for a periocular conformation of at least the periocular region of the user; calculate, based at least partly on the periocular face parameters, lower face parameters for a lower region of the face of the user, the lower region not imaged by the inward-facing imaging system; and combine the periocular face parameters and the lower face parameters to generate full face parameters for the face of the user.

41. A method comprising: under control of a wearable display system comprising an inward-facing imaging system configured to capture an image of a periocular region of a wearer of the wearable display, non-transitory memory configured to store the image of the periocular region; and a hardware processor in communication with the non-transitory memory: accessing the image of the periocular region of the wearer; generating, based at least partly on the image, periocular region parameters encoding periocular features of the wearer; generating lower face parameters based at least partly on the periocular region parameters; and generating a representation of the full face of the wearer based at least partly on the lower face parameters and the periocular region parameters.

42. A wearable system comprising: an inward-facing imaging system configured to image a periocular region of a wearer of the wearable system; and a hardware processor programmed to: access a periocular image, obtained via the inward-facing imaging system, of the periocular region of the wearer; determine a fit level of the wearable system on the wearer, wherein the fit level comprises a loose fit or a tight fit; in response to a determination of a loose fit, generate periocular face parameters that encode a periocular conformation of at least the periocular region of the wearer, the periocular face parameters generated based at least partly on intensity measurements or optical flow of patches in the periocular region; or in response to a determination of a tight fit, generate the periocular face parameters based at least partly on movement of the wearable system relative to the face of the wearer, the movement responsive to a facial expression of the wearer; generate, based at least partly on the periocular face parameters, lower face parameters of the lower face of the wearer, wherein the lower face is unobserved by the inward-facing imaging system when worn by the wearer; and combine the periocular face parameters and the lower face parameters to generate full face parameters associated with a three-dimensional (3D) face model of the wearer.

43. A method comprising: under control of a head-mounted display system comprising an inward-facing imaging system configured to image a periocular region of a wearer of the wearable system and a hardware processor: accessing a periocular image, obtained via the inward-facing imaging system, of the periocular region of the wearer; determining a fit level of the wearable system on the wearer, wherein the fit level comprises a loose fit or a tight fit; in response to a determination of a loose fit, generating periocular face parameters that encode a periocular conformation of at least the periocular region of the wearer, the periocular face parameters generated based at least partly on intensity measurements or optical flow of patches in the periocular region; or in response to a determination of a tight fit, generating the periocular face parameters based at least partly on movement of the wearable system relative to the face of the wearer, the movement responsive to a facial expression of the wearer; generating, based at least partly on the periocular face parameters, lower face parameters of the lower face of the wearer, wherein the lower face is unobserved by the inward-facing imaging system when worn by the wearer; and combining the periocular face parameters and the lower face parameters to generate full face parameters associated with a three-dimensional (3D) face model of the wearer.

Although various examples and embodiments described herein utilize images of the periocular region to generate full facial images, this is for illustration and is not limiting. Some such embodiments may utilize the periocular imagery and may not use other sensor data (e.g., audio data) in generating the full facial images (which may be advantageous when the user is not speaking). Some embodiments can additionally utilize other sensor input to assist in generating the full facial images, thereby utilizing a multi-modal approach to generate the full facial images. For example, audio data obtained from the microphone 69 may be used to associate facial conformations with sounds in the audio data, and the facial conformations can be used together with the periocular imagery to generate the full facial image.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time (e.g., for real-time animation of a virtual character). For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable system comprising:
    an inward-facing imaging system configured to image a periocular region of a wearer of the wearable system; and
    a hardware processor programmed to:
    access a periocular image, obtained via the inward-facing imaging system, of the periocular region of the wearer;
    determine a fit level of the wearable system on the wearer, wherein the fit level comprises a loose fit or a tight fit;
    in response to a determination of a loose fit, generate periocular face parameters that encode a periocular conformation of at least the periocular region of the wearer, the periocular face parameters generated based at least partly on intensity measurements or optical flow of patches in the periocular region; or
    in response to a determination of a tight fit, generate the periocular face parameters based at least partly on movement of the wearable system relative to the face of the wearer, the movement responsive to a facial expression of the wearer;
    generate, based at least partly on the periocular face parameters, lower face parameters of the lower face of the wearer, wherein the lower face is unobserved by the inward-facing imaging system when worn by the wearer; and
    combine the periocular face parameters and the lower face parameters to generate full face parameters associated with a three-dimensional (3D) face model of the wearer.

2. The wearable system of claim 1, wherein the periocular conformation comprises extensions and compressions of periocular muscles, wrinkles, blemishes, or patches in the periocular region, eyelids, or eyebrows.

3. The wearable system of claim 1, wherein the inward-facing imaging system comprises an infrared light emitting diode (IR LED) or a photo-reflective sensor configured to detect a light intensity of the periocular region.

4. The wearable system of claim 1, further comprising an electrooculography (EOG) sensor, wherein the wearable system is configured to determine eye positions from readings of EOG sensor.

5. The wearable system of claim 1, further comprising an audio sensor, wherein a lower face conformation is checked for consistency against phonemes recorded from the audio sensor.

6. The wearable system of claim 1, wherein the full face parameters are stored for use by a rendering engine to generate a 3D animation of the face of the wearer.

7. A method comprising:
    under control of a head-mounted display system comprising an inward-facing imaging system configured to image a periocular region of a wearer of the head-mounted display system and a hardware processor:
    accessing a periocular image, obtained via the inward-facing imaging system, of the periocular region of the wearer;
    determining a fit level of the head-mounted display system on the wearer, wherein the fit level comprises a loose fit or a tight fit;
    in response to a determination of a loose fit, generating periocular face parameters that encode a periocular conformation of at least the periocular region of the wearer, the periocular face parameters generated based at least partly on intensity measurements or optical flow of patches in the periocular region; or
    in response to a determination of a tight fit, generating the periocular face parameters based at least partly on movement of the head-mounted display system relative to the face of the wearer, the movement responsive to a facial expression of the wearer;
    generating, based at least partly on the periocular face parameters, lower face parameters of the lower face of the wearer, wherein the lower face is unobserved by the inward-facing imaging system when worn by the wearer; and
    combining the periocular face parameters and the lower face parameters to generate full face parameters associated with a three-dimensional (3D) face model of the wearer.

8. The method of claim 7, wherein a lower face conformation is cross-checked for full face consistency based on an eyebrow position.

9. The method of claim 7, wherein the fit level of the wearable system on the wearer is determined based on eye positions.

10. The method of claim 7, wherein calibration data specific to the wearer is obtained.

11. The system of claim 9, wherein the eye positions are determined from pupil-glint tracking.

* * * * *

UNITED STATES PATENT AND TRADEMARK OFFICE
CERTIFICATE OF CORRECTION

PATENT NO. : 10,775,618 B2  
APPLICATION NO. : 16/295575  
DATED : September 15, 2020  
INVENTOR(S) : Alexander Ilic It is certified that error appears in the above-identified patent and that said Letters Patent is hereby corrected as shown below:

In the Specification

Column 2, Line 44, delete "FIG." and insert --FIGS.--.

Column 2, Line 53, delete "FIG." and insert --FIGS.--.

Column 2, Line 65, delete "FIG." and insert --FIGS.--.

Column 22, Line 48, delete "electrophyisiological" and insert --electrophysiological--.

Column 25, Line 39, delete "headpose" and insert --head pose--.

Column 26, Line 5, delete "FIG." and insert --FIGS.--.

Column 27, Line 2, delete "FIG." and insert --FIGS.--.

Column 31, Line 33, delete "FIG." and insert --FIGS.--.

Column 32, Line 32, delete "FIG." and insert --FIGS.--.

Column 32, Line 45, delete "FIG." and insert --FIGS.--.

Column 41, Line 7, delete "wearer," and insert --wearer.--.

In the Claims

Column 46, Line 59, Claim 11, delete "system" and insert --method--.

Signed and Sealed this  
Seventeenth Day of November, 2020

Andrei Iancu  
*Director of the United States Patent and Trademark Office*